(12) United States Patent
Mitchell, III

(10) Patent No.: US 11,884,380 B2
(45) Date of Patent: Jan. 30, 2024

(54) FLIGHT CONTROL SURFACE ACTUATION SYSTEMS INCLUDING SKEW DETECTION SYSTEMS, AND ASSOCIATED METHODS

(71) Applicant: The Boeing Company, Chicago, IL (US)

(72) Inventor: Ira Mitchell, III, Seattle, WA (US)

(73) Assignee: The Boeing Company, Arlington, VA (US)

( * ) Notice: Subject to any disclaimer, the term of this patent is extended or adjusted under 35 U.S.C. 154(b) by 175 days.

(21) Appl. No.: 17/522,734

(22) Filed: Nov. 9, 2021

(65) Prior Publication Data

US 2022/0144413 A1 May 12, 2022

Related U.S. Application Data

(60) Provisional application No. 63/112,070, filed on Nov. 10, 2020.

(51) Int. Cl.
*B64C 13/38* (2006.01)
*B64C 9/00* (2006.01)
(Continued)

(52) U.S. Cl.
CPC ............. *B64C 13/38* (2013.01); *B64C 9/00* (2013.01); *B64C 13/16* (2013.01); *B64C 13/34* (2013.01)

(58) Field of Classification Search
CPC ......... B64C 13/38; B64C 13/16; B64C 13/34; B64C 9/00
See application file for complete search history.

(56) References Cited

U.S. PATENT DOCUMENTS 5,680,124 A 10/1997 Bedell et al.
6,382,566 B1 5/2002 Ferrel et al.
(Continued)

FOREIGN PATENT DOCUMENTS

EP 3078596 A1 10/2016
EP 3643619 A1 4/2020
(Continued)

OTHER PUBLICATIONS

European Patent Office, Extended European Search Report for related European patent application EP 21198831.6, dated Feb. 28, 2022.

*Primary Examiner* — Rodney A Bonnette
(74) *Attorney, Agent, or Firm* — Kolitch Romano Dascenzo Gates LLC

(57) ABSTRACT

Flight control surface actuation systems including skew detection systems and associated methods. A flight control surface actuation system includes a skew detection system configured to generate a skew detection signal that represents a skew condition of a flight control surface. In some examples, the skew detection system includes a skew lanyard and a detection mechanism assembly (DMA) configured to detect a lanyard displacement of the skew lanyard and to generate an analog lanyard displacement signal. In some examples, the skew detection system includes a hybrid sensing actuator that includes an actuator output and an actuator output position sensor directly coupled to the actuator output. Methods of utilizing a flight control surface actuation system include detecting a skew condition in the flight control surface utilizing DMAs and/or hybrid sensing actuators.

20 Claims, 8 Drawing Sheets

(51) Int. Cl.
*B64C 13/16* (2006.01)
*B64C 13/34* (2006.01)

(56) References Cited

U.S. PATENT DOCUMENTS

| | | | |
|---|---|---|---|
| 6,466,141 B1* | 10/2002 | McKay | B64C 13/00 |
| | | | 340/963 |
| 8,115,649 B2 | 2/2012 | Moy et al. | |
| 2008/0265090 A1 | 10/2008 | Schievelbusch | |
| 2010/0064823 A1 | 3/2010 | Schlegel et al. | |
| 2017/0283039 A1* | 10/2017 | McCormick | B64C 9/22 |
| 2018/0002028 A1 | 1/2018 | Polcuch | |

FOREIGN PATENT DOCUMENTS

| | | | |
|---|---|---|---|
| EP | 3653493 A1 | 5/2020 | |
| WO | WO 2019/239103 A1 | 12/2019 | |

\* cited by examiner

FIG. 2

FLIGHT CONTROL SURFACE ACTUATION SYSTEMS INCLUDING SKEW DETECTION SYSTEMS, AND ASSOCIATED METHODS

RELATED APPLICATION

The present application is a non-provisional of and claims priority to U.S. Provisional Patent Application No. 63/112,070, filed on Nov. 10, 2020, entitled "FLIGHT CONTROL SURFACE ACTUATION SYSTEMS INCLUDING SKEW DETECTION SYSTEMS, AND ASSOCIATED METHODS," the complete disclosure of which is incorporated by reference.

FIELD

The present disclosure relates to flight control surface actuation systems including skew detection systems, and associated methods.

BACKGROUND

A powered skew condition of a flight control surface occurs when one portion of the flight control surface is stuck in position while another portion of the flight control surface is actively driven. This condition drives undesirable loads into the supporting structure. Some vehicles include skew detection systems configured to detect when this failure condition is developing and to issue a command to cease actively driving the flight control surface. The flight control surface and the surrounding support structure may be engineered to handle loads driven into the structure corresponding to a maximum permissible skew magnitude. In such examples, configuring the vehicle to sustain a greater magnitude of a skew condition before shutting down the flight control surface necessitates engineering the structures to sustain increased load, which has size and weight impacts. Existing skew detection systems have drawbacks that increase the minimum skew magnitude that can reliably be detected, which in turn increases the maximum permissible skew magnitude.

Position sensing of the flight control surfaces also is central to operation of a vehicle, such as an aircraft. Monitoring the position of the flight control surfaces is required to ensure accurate positioning of the surfaces in the desired configuration. The potential for out-of-position surfaces must be accounted for in flight sciences and structures analysis. For example, out-of-position surfaces may result in higher drag than in a nominal configuration, reducing fuel efficiency and thus increasing costs to users. Additionally, out-of-position surfaces may result in higher loads on supporting structures, which may result in increased size and weight. The position data may be utilized for closed loop feedback of flight control surfaces.

SUMMARY

Flight control surface actuation systems including skew detection systems, and associated methods, are disclosed herein. A flight control surface actuation system for operating a flight control surface of a wing of a vehicle includes a control surface actuator configured to be operatively coupled to a corresponding control surface segment of the flight control surface and a skew detection system configured to detect a skew condition in the flight control surface. The control surface actuator is configured to transition the corresponding control surface segment among a plurality of segment configurations defined between and including a retracted configuration and an extended configuration. The skew detection system is configured to generate a skew detection signal that at least partially represents the skew condition of the flight control surface.

In some examples, the skew detection system includes a skew lanyard configured to be operatively coupled to each control surface segment of a skew lanyard subset of the control surface segments of the flight control surface and a detection mechanism assembly (DMA) configured to detect a lanyard displacement of the skew lanyard relative to a nominal configuration of the skew lanyard. In such examples, the DMA is configured to generate a lanyard displacement signal that at least partially represents the lanyard displacement. In such examples, the skew detection signal includes the lanyard displacement signal, and the DMA is configured such that the lanyard displacement signal indicates that the lanyard displacement is any of a continuous plurality of values.

In some examples, the flight control surface actuation system includes a driveline configured to be operatively coupled to each of a plurality of control surface actuators and =configured to actuate each control surface actuator. In some such examples, the skew detection system includes a hybrid sensing actuator that includes a gear train operatively coupled to the driveline, an actuator output operatively coupled to the respective segment end of the corresponding control surface segment, and an actuator output position sensor directly coupled to the actuator output. In such examples, the actuator output is configured to drive the respective segment end between the stowed position and the deployed position, and the actuator output position signal indicates a rotational position and/or a linear position of the actuator output. In such examples, the skew detection signal includes the actuator output position signal, and at least one control surface actuator includes the hybrid sensing actuator. Methods of utilizing a flight control surface actuation system to operate a flight control surface of a wing of a vehicle include detecting, with the flight control surface actuation system, a skew condition in the flight control surface.

In some examples, the detecting the skew condition includes generating a lanyard displacement signal with a DMA and generating a skew condition signal that represents a magnitude of the skew condition in the flight control surface. In such examples, the generating the skew condition signal is at least partially based on the lanyard displacement signal.

In some examples, the detecting the skew condition includes generating an actuator output position signal with an actuator output position sensor of a hybrid sensing actuator. In such examples, the detecting the skew condition further includes generating a skew condition signal at least partially based upon the actuator output position signal. In such examples, the skew condition signal represents a presence and/or a magnitude of the skew condition in the flight control surface.

BRIEF DESCRIPTION OF THE DRAWINGS

FIG. 2 is a schematic top plan view illustrating examples of flight control surface actuation systems utilized in conjunction with a flight control surface in a retracted position according to the present disclosure.

DESCRIPTION

Figure 1:
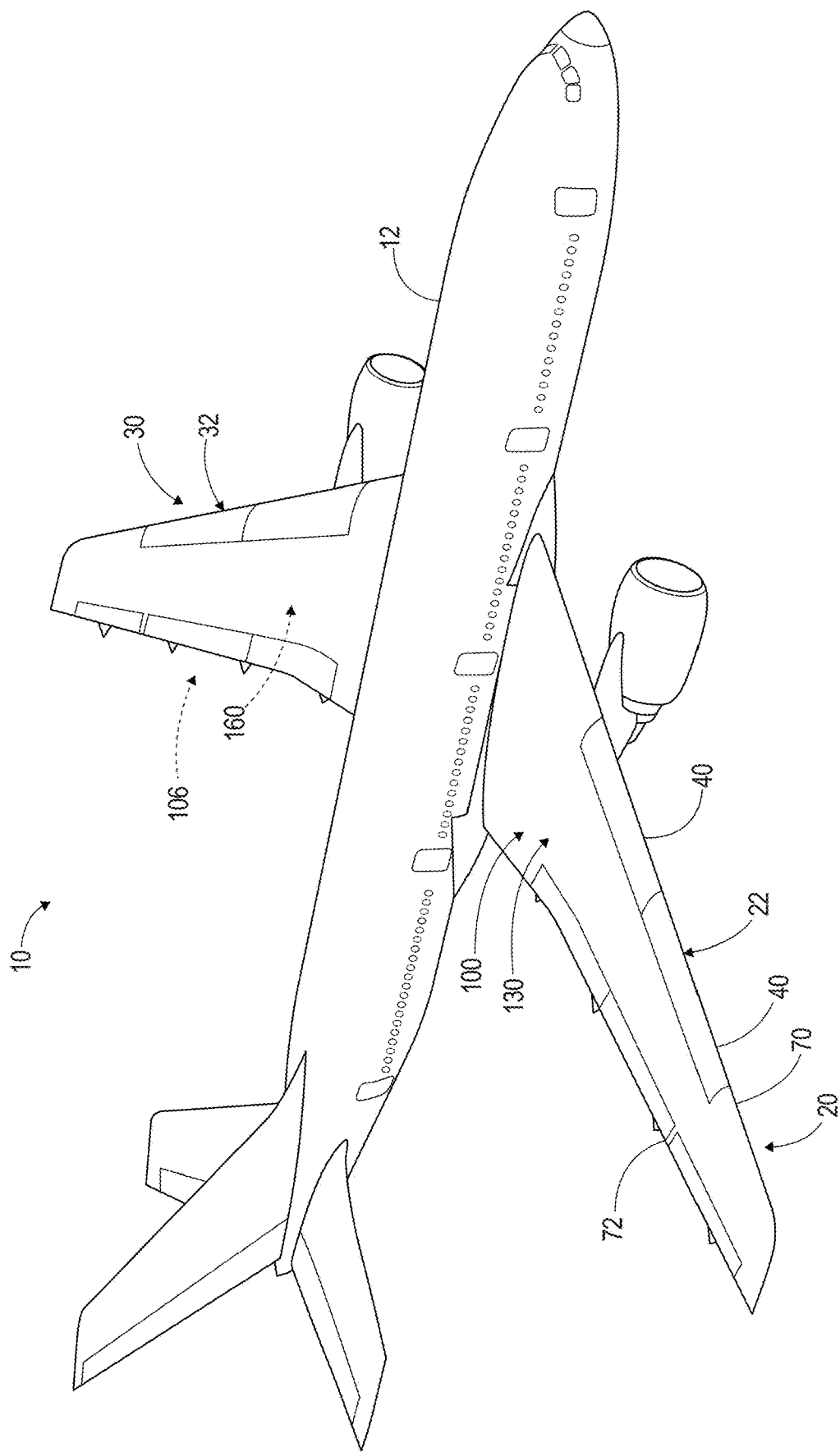
FIG. 1 is a representation of a vehicle including examples of flight control surface actuation systems according to the present disclosure.

FIGS. 1-9 provide illustrative, non-exclusive examples of flight control surface actuation systems 100, of skew detection systems 130, and/or of methods 200 of utilizing flight control surface actuation systems 100, according to the present disclosure. Elements that serve a similar, or at least substantially similar, purpose are labeled with like numbers in each of FIGS. 1-9, and these elements may not be discussed in detail herein with reference to each of FIGS. 1-9. Similarly, all elements may not be labeled in each of FIGS. 1-9, but reference numerals associated therewith may be utilized herein for consistency. Elements, components, and/or features that are discussed herein with reference to one or more of FIGS. 1-9 may be included in and/or utilized with any of FIGS. 1-9 without departing from the scope of the present disclosure. Generally, in the Figures, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a particular example without departing from the scope of the present disclosure.

FIG. 1 is a representation of an example of a vehicle 10 that may include and/or utilize flight control surface actuation systems 100 according to the present disclosure. In various examples, and as illustrated in FIG. 1, vehicle 10 includes a fuselage 12 and at least one wing 20 extending from fuselage 12. Wing 20 includes a flight control surface 22, as described in more detail herein. In some examples, and as illustrated in FIG. 1, wing 20 is a first wing 20, and vehicle 10 additionally includes a second wing 30 extending from fuselage 12. As discussed in more detail below, each of first wing 20 and second wing 30 may include and/or utilize respective instances of flight control surface actuation systems 100 according to the present disclosure. Accordingly, while the following examples generally relate to examples in which wing 20 (e.g., first wing 20) includes flight control surface actuation system 100, it is to be understood that any features, aspects, components, functions, etc. of flight control surface actuation system 100 and/or of wing 20 also may be understood as referring to features, aspects, components, functions, etc. of an analogous flight control surface actuation system 100 and/or of second wing 30. Flight control surface actuation system 100 may be configured to be utilized in conjunction with any of a variety of vehicles 10 including flight control surfaces 22. In some examples, such as in the example of FIG. 1, vehicle 10 is an aircraft, such as a fixed-wing aircraft.

Figure 2:
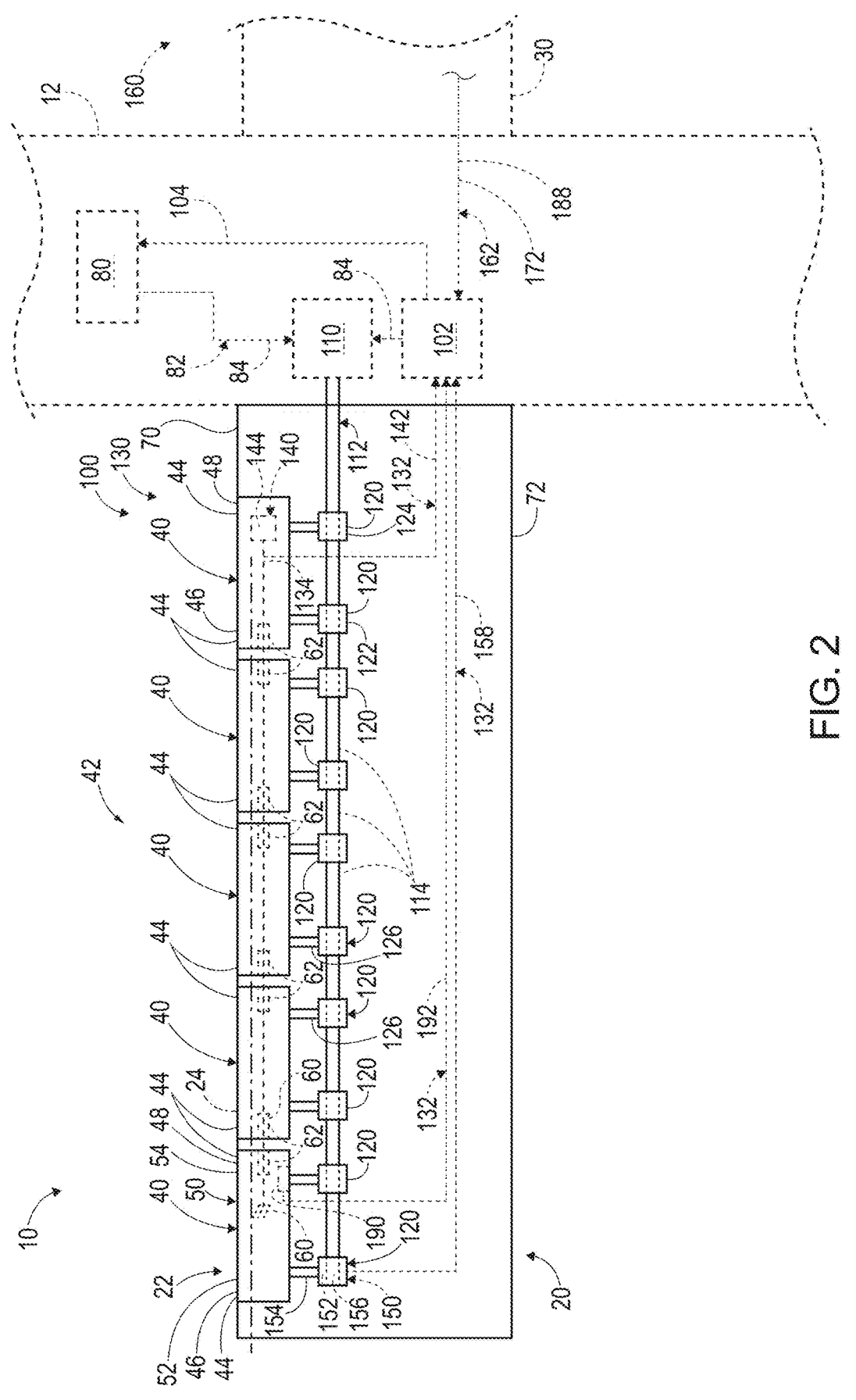

FIGS. 2-7 schematically illustrate examples of flight control surface actuation systems 100 for operating flight control surface 22 of wing 20 of vehicle 10. As schematically illustrated in FIGS. 2-7, flight control surface actuation systems 100 according to the present disclosure are configured to be utilized in conjunction with flight control surface 22 that includes one or more control surface segments 40 that are configured to move relative to at least a portion of wing 20, such as to selectively alter one or more aerodynamic properties of wing 20. In particular, and as schematically illustrated in FIGS. 2-7, flight control surface actuation system 100 includes a control surface actuator 120 operatively coupled to a corresponding control surface segment 40 of flight control surface 22. More specifically, and as schematically illustrated in FIG. 2, control surface actuator 120 includes an actuator output 126 that is operatively coupled to the corresponding control surface segment 40. Control surface actuator 120 is configured to transition the corresponding control surface segment 40 among a plurality of segment configurations defined between and including a retracted configuration and an extended configuration. Similarly, flight control surface 22 is configured to transition among a plurality of control surface positions defined between and including a retracted position, in which each control surface segment 40 of flight control surface 22 is in the retracted configuration, and an extended position, in which each control surface segment 40 of flight control surface 22 is in the extended configuration.

As used herein, flight control surface 22 may refer to, include, and/or be any of a variety of structures and/or systems associated with wing 20, and may have any of a variety of positions and/or locations relative to wing 20. In some examples, and as schematically illustrated in FIGS. 2-7, flight control surface 22 is positioned adjacent to a leading edge 70 of wing 20. In some such examples, flight control surface 22 at least partially defines leading edge 70. As more specific examples, flight control surface 22 may include and/or be a leading edge flight control surface such as a slat, and/or a Krueger panel. Additionally or alternatively, in some such examples, each control surface segment 40 includes and/or is such a leading edge flight control surface.

While the present disclosure generally relates to examples in which flight control surface 22 is associated with leading edge 70 of wing 20, this is not required of all examples of flight control surface actuation system 100, and it is additionally within the scope of the present disclosure that flight control surface 22 may be positioned adjacent to and/or may at least partially define a trailing edge 72 of wing 20. As examples, flight control surface 22 (and/or at least one control surface segment 40 thereof) may include and/or be a flap, a flaperon, and/or an aileron.

Figure 3:
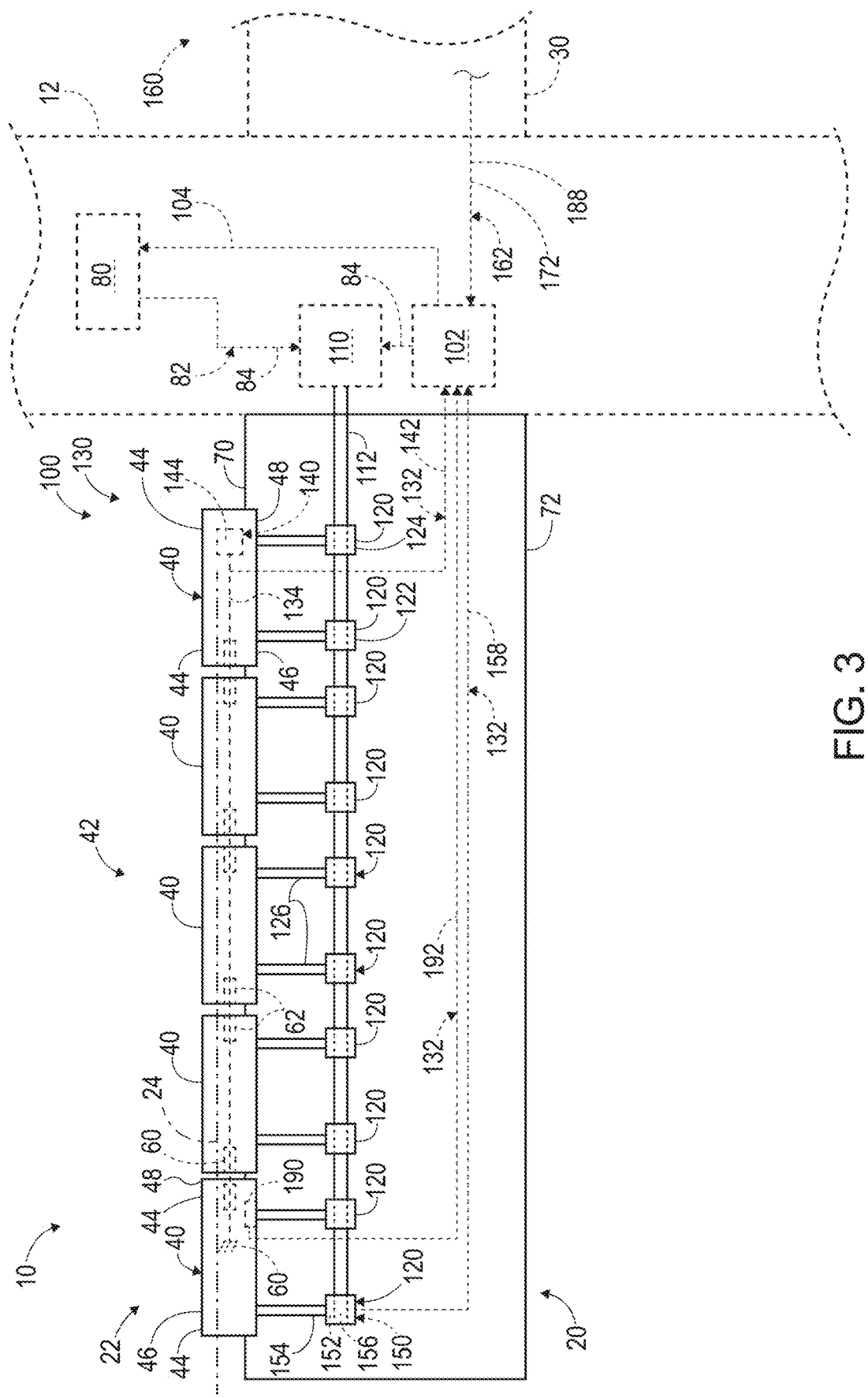
FIG. 3 is a schematic top plan view illustrating examples of flight control surface actuation systems utilized in conjunction with a flight control surface in an extended position according to the present disclosure.

In some examples, and as schematically illustrated in FIGS. 2-7, flight control surface actuation system 100 includes a plurality of control surface actuators 120 such that each control surface actuator 120 is operatively coupled to a respective segment end 44 of the corresponding control surface segment 40. In such examples, each control surface actuator 120 may be described as being configured to transition the respective segment end 44 among a plurality of segment end positions defined between and including a stowed position and a deployed position. In such examples, a given control surface segment 40 (e.g., a particular control surface segment 40 and/or the control surface segment 40 corresponding to control surface actuator 120) may be described as being in the retracted configuration when each respective segment end 44 of the given control surface segment 40 is in the stowed position. Similarly, the given control surface segment 40 may be described as being in the extended configuration when each respective segment end 44 of the given control surface segment 40 is in the deployed position. As a more specific example, FIG. 2 schematically illustrates a configuration in which each segment end 44 of each control surface segment 40 is in the stowed position such that each control surface segment 40 is in the retracted configuration and flight control surface 22 is in the retracted position. As another example, FIG. 3 schematically illustrates a configuration in which each control surface actuator 120 has operatively transitioned each respective segment end 44 to the deployed position such that each control surface segment 40 is in the extended configuration and flight control surface 22 is in the extended position.

As used herein, actuator output 126 is intended to refer to and/or encompass any suitable structure and/or mechanism that conveys a mechanical output of control surface actuator 120 to the corresponding control surface segment 40 and/or segment end 44 thereof. As examples, actuator output 126 may include and/or be a pinion gear, a lead screw, a jack screw, a rotary linkage, a linear linkage, etc. Additionally, as used herein, the term "position," as used to describe a state and/or configuration of actuator output 126, is intended to refer to any of a variety of states and/or configurations that correspond to the segment end position of the respective segment end 44 that is driven by actuator output 126. In this manner, as used herein, the position of actuator output 126 generally may be understood as directly corresponding to the segment end position of the respective segment end 44.

In some examples, each control surface segment 40 of flight control surface 22 includes a corresponding pair of segment ends 44, each of which is selectively transitioned between the stowed position and the deployed position by a respective control surface actuator 120. In such examples, and as schematically illustrated in FIGS. 2-7, each such control surface segment 40 may be described as having a first segment end 46 and a second segment end 48 that is opposite first segment end 46 (e.g., on an opposite side of control surface segment 40 than first segment end 46).

In some examples, the collection of respective segment ends 44 of each control surface segment 40 of flight control surface 22 are configured to move at least substantially in unison as flight control surface 22 operatively transitions between the retracted position and the extended position. In this manner, flight control surface 22 may be described as being in a nominal condition when each respective segment end 44 of each control surface segment 40 of flight control surface 22 moves at least substantially in unison as flight control surface 22 transitions between the retracted position and the extended position. Stated differently, flight control surface 22 may be configured such that first segment end 46 and second segment end 48 of each control surface segment 40 of flight control surface 22 move at least substantially in unison as flight control surface 22 transitions between the retracted position and the extended position when flight control surface 22 is in the nominal condition.

Figure 4:
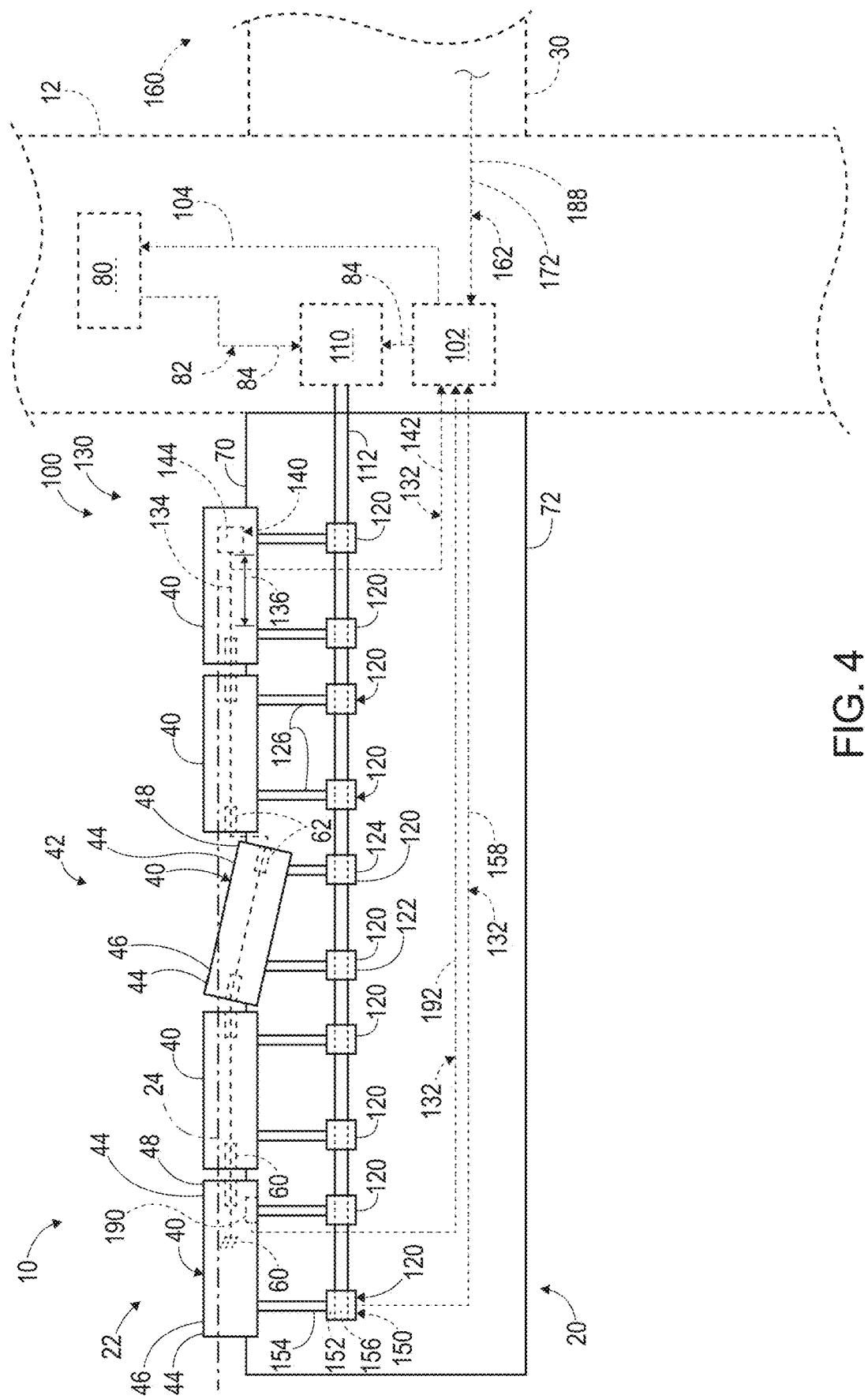
FIG. 4 is a schematic top plan view illustrating examples of flight control surface actuation systems utilized in conjunction with a flight control surface in a skew condition according to the present disclosure.

However, in some cases, flight control surface 22 may enter an operational condition in which the collection of respective segment ends 44 of each control surface segment 40 of a given (e.g., a particular) flight control surface 22 do not move in unison and/or do not exhibit the same segment end positions. In such examples, the given flight control surface 22 may be described as being in a skew condition. More specifically, a given flight control surface 22 may be described as being in the skew condition when at least one segment end 44 of at least one control surface segment 40 of the given flight control surface 22 has a segment end position that is different than the segment end position of at least one other segment end 44 of at least one control surface segment 40 of the given flight control surface 22. Such a condition may arise, for example, when two or more control surface actuators 120 associated with a given flight control surface 22 and/or with a given control surface segment 40 operate at least partially independent of one another. As a more specific example, flight control surface 22 may be in the skew condition if at least one control surface actuator 120 fails to transition a respective segment end 44 (e.g., first segment end 46 or second segment end 48) of the corresponding control surface segment 40 between the stowed position and the deployed position while control surface actuator 120 associated with the opposite segment end 44 of the corresponding control surface segment 40 operatively transitions the opposite segment end 44 between the stowed position and the deployed position. For example, and as schematically illustrated in FIG. 4, flight control surface 22 may include a first control surface actuator 122 operatively coupled to first segment end 46 of a corresponding control surface segment 40 and a second control surface actuator 124 operatively coupled to second segment end 48 of the corresponding control surface segment 40. In such an example, flight control surface 22 may be described as being in the skew condition when the first control surface actuator 122 and/or the second control surface actuator 124 is at least partially disabled from operatively transitioning the respective segment end 44 between the stowed position and the deployed position.

In an example in which flight control surface 22 is in the skew condition, continuing to drive flight control surface 22 between the retracted configuration and the extended configuration may operate to drive undesirable loads into flight control surface 22 and/or wing 20. For example, FIG. 4 may be described as illustrating an example in which second control surface actuator 124 is inoperative and/or otherwise operatively uncoupled from second segment end 48 of the corresponding control surface segment 40. In an example in which control surface actuator 120 is operatively uncoupled from the corresponding segment end 44, flight control surface 22 may be described as being in a freewheeling skew condition. In other examples in which control surface actuator 120 is inoperative, continuing to drive the corresponding segment end 44 of the corresponding control surface segment 40 toward the deployed position may result in a jam condition and/or application of undesirable forces upon neighboring control surface segments 40, wing 20, etc. In such examples, flight control surface 22 may be described as being in a powered skew condition. As discussed in more detail herein, flight control surface actuation systems 100 and methods 200 according to the present disclosure generally are directed to detecting and/or identifying skew conditions with high precision, enabling such skew conditions to be resolved while limiting the application of undesirable forces to wing 20.

The skew condition of flight control surface 22 may be defined in any of a variety of manners. As an example, each segment configuration of the plurality of segment configurations of control surface segment 40 may define a target orientation for control surface segment 40, and flight control surface 22 may be in the skew condition when at least one control surface segment 40 of flight control surface 22 defines a skew orientation that differs from the target orientation. As more specific examples, the skew orientation may be rotated relative to the target orientation, may be at least partially underdeployed relative to the target orientation, and/or may be at least partially overdeployed relative to the target orientation. Additionally or alternatively, flight control surface 22 may be described as being in the skew condition when at least one segment end 44 of at least one control surface segment 40 (and/or the segment end position thereof) is proximal to the stowed position relative to at least one other segment end 44 of at least one control surface segment 40 (e.g., of the same control surface segment 40 and/or of another control surface segment 40 of flight control surface 22).

As yet another example, flight control surface 22 may be described as being in the skew condition when at least one control surface segment 40 of flight control surface 22 is misaligned, such as relative to at least one other control surface segment 40 of flight control surface 22 and/or relative to an overall extent of flight control surface 22. For example, and as schematically illustrated in FIGS. 2-5, flight control surface 22 may extend along and define a control surface axis 24 such that each control surface segment 40 extends at least substantially parallel to control surface axis 24 when flight control surface 22 is in the nominal condition. In such an example, flight control surface 22 may be described as being in the skew condition when at least one control surface segment 40 is nonparallel with control surface axis 24 and/or with at least one other control surface segment 40.

FIG. 4 schematically illustrates an example in which flight control surface 22 is in the skew condition. In particular, FIG. 4 schematically illustrates an example in which second control surface actuator 124 associated with second segment end 48 of a particular control surface segment 40 is at least partially disabled from transitioning second segment end 48 to the deployed position, such that flight control surface 22 is in the skew condition. As a more specific example, FIG. 4 may be described as schematically illustrating a configuration in which second control surface actuator 124 associated with the particular control surface segment 40 is operatively uncoupled from the corresponding segment end 44 such that flight control surface 22 is in a freewheeling skew condition. Alternatively, FIG. 4 may be described as schematically illustrating a configuration in which flight control surface 22 is in a powered skew condition. Accordingly, in the example of FIG. 4, first segment end 46 and second segment end 48 of the particular control surface segment 40 have different segment positions, such that the particular control surface segment 40 is nonparallel with control surface axis 24, and flight control surface 22 is in the skew condition. Stated differently, FIG. 4 schematically illustrates an example in which second segment end 48 is underdeployed relative to the target orientation of the particular control surface segment 40, such that flight control surface 22 is in the skew condition.

In some examples, it may be desirable to limit and/or cease operation of flight control surface 22 when flight control surface 22 is in the skew condition. For example, and as discussed, when flight control surface 22 is in the skew condition, operating each control surface actuator 120 to transition flight control surface 22 between the retracted position and the extended position may yield a jam condition and/or may exacerbate a mechanical fault associated with flight control surface 22. Thus, it generally is desirable to detect the presence of a skew condition of flight control surface 22 prior to developing a mechanical fault that may be costly and/or time-intensive to repair. Accordingly, as schematically illustrated in FIGS. 2-7 and as described herein, flight control surface actuation systems 100 according to the present disclosure include a skew detection system 130 configured to detect a skew condition in flight control surface 22.

Flight control surface actuation system 100 may be configured to operate each control surface actuator 120 in any of a variety of manners such that each control surface segment 40 moves at least substantially in unison. In some examples, and as schematically illustrated in FIGS. 2-5 and 7, flight control surface actuation system 100 includes a driveline 112 that is operatively coupled to each control surface actuator 120 and that is configured to actuate each control surface actuator 120. In such examples, and as additionally schematically illustrated in FIGS. 2-5, flight control surface actuation system 100 additionally includes a power drive unit 110 that is configured to generate a torque in driveline 112 to selectively actuate each control surface actuator 120. Thus, in such examples, flight control surface actuation system 100 may be configured to selectively transition each segment end 44 of each control surface segment 40 of flight control surface 22 between the stowed position and the deployed position by generating a torque with power drive unit 110 to rotate driveline 112 and thus to actuate each control surface actuator 120 in unison. In this manner, in such examples, a driveline position of driveline 112 (e.g., a rotational position, such as a number of revolutions of driveline 112 relative to a nominal and/or initial rotational position) may correspond to the segment end position of each segment end 44, and thus may correspond to the control surface position of flight control surface 22. Stated differently, in such examples, a measurement and/or determination of the rotational position of driveline 112 may enable and/or correspond to a measurement and/or determination of the control surface position of flight control surface 22, at least when flight control surface 22 is in the nominal condition. In various examples, the determination of the control surface position of flight control surface 22 is a central factor in the operation of flight control surface 22. For example, a measurement of the driveline position of driveline 112, and thus of the control surface position of flight control surface 22, may be utilized in closed-loop feedback routines that are critical to the proper operation of flight control surface 22. Accordingly, in some examples, and as described in more detail herein, skew detection system 130 is configured to detect the driveline position of driveline 112. In such examples, the driveline position may include and/or be the rotational position of driveline 112, such as relative to a nominal and/or initial rotational position.

Driveline 112 may include and/or be any of a variety of structures such that driveline 112 is operable to selectively actuate each control surface actuator 120 in unison. In some examples, and as schematically illustrated in FIG. 2, driveline 112 includes one or more torque tubes 114 that are operatively coupled to one another and that rotate at least substantially in unison. In some such examples, at least one control surface actuator 120 is operatively coupled to each of a corresponding pair of torque tubes 114 to operatively couple the corresponding pair of torque tubes 114 to one another.

Flight control surface actuation system 100 may be configured to detect the skew condition in flight control surface 22 in any of a variety of manners and/or with any of a variety of structures and/or processes, as described herein. In some examples, and as schematically illustrated in FIGS. 2-5, flight control surface actuation system 100 includes a controller 102 that is configured to generate a skew condition signal 104 that represents a presence and/or a magnitude of the skew condition in flight control surface 22. In such examples, and as described herein, controller 102 may be configured to generate skew condition signal 104 based upon any of a variety of inputs that represent a state or status of flight control surface 22.

In some examples, as schematically illustrated in FIGS. 2-5 and as described in more detail herein, skew detection system 130 is configured to generate a skew detection signal 132 that at least partially represents the skew condition (e.g., the presence and/or magnitude of the skew condition) of flight control surface 22 and/or to transmit skew detection signal 132 to controller 102. In such examples, controller 102 may be configured to generate skew condition signal 104 at least partially based upon skew detection signal 132. Stated differently, in such examples, and as described in more detail herein, skew detection signal 132 may include and/or be a representation of a configuration and/or an operational state of a portion of flight control surface actuation system 100 (e.g., of driveline 112, of flight control surface 22, and/or of any component thereof). By contrast, skew condition signal 104 may include and/or be a determination and/or an identification of an operational status of flight control surface 22 (e.g., of the skew condition and/or of the nominal configuration), as informed by and/or determined based on skew detection signal 132.

In some examples, and as schematically illustrated in FIGS. 2-5, vehicle 10 additionally includes a flight control unit 80 that is configured to at least partially control operation of vehicle 10 and/or of flight control surface 22. In such examples, and as schematically illustrated in FIGS. 2-5, controller 102 may be configured to transmit skew condition signal 104 to flight control unit 80. Additionally or alternatively, in some examples, and as schematically illustrated in FIGS. 2-5, flight control unit 80 may be configured to generate and transmit a driveline control signal 82 to power drive unit 110 to at least partially control operation of flight control surface 22. In some examples, flight control unit 80 generates driveline control signal 82 at least partially based upon skew condition signal 104. While FIGS. 2-5 schematically illustrate controller 102 and flight control unit 80 as being distinct from one another, this is not required of all examples of flight control surface actuation system 100, and it is additionally within the scope of the present disclosure that controller 102 includes at least a portion of flight control unit 80, and/or vice versa. As a more specific example, controller 102 and flight control unit 80 may refer to respective software, processes, modules, automated instructions, etc. that are associated with a common device and/or computer.

In some examples, as schematically illustrated in FIGS. 2-5 and as discussed in more detail below, controller 102 and/or flight control unit 80 is configured to generate a control surface shutdown signal 84 and to transmit control surface shutdown signal 84 to power drive unit 110. In some such examples, control surface shutdown signal 84 commands power drive unit 110 to cease generating the torque in driveline 112, such as in response to detection of the skew condition in flight control surface 22. In some such examples, driveline control signal 82 includes and/or is control surface shutdown signal 84.

Controller 102 and/or flight control unit 80 each may be any suitable device or devices that are configured to perform the respective functions discussed herein. For example, each of controller 102 and/or flight control unit 80 may include one or more of an electronic controller, a dedicated controller, a special-purpose controller, a personal computer, a special-purpose computer, a display device, a logic device, a memory device, and/or a memory device having non-transitory computer readable media suitable for storing computer-executable instructions for implementing aspects of systems and/or methods according to the present disclosure. Additionally or alternatively, controller 102 and/or flight control unit 80 each may include, or be configured to read, non-transitory computer readable storage, or memory, media suitable for storing computer-executable instructions, or software, for implementing methods or steps of methods according to the present disclosure. Examples of such media include CD-ROMs, disks, hard drives, flash memory, etc. As used herein, storage, or memory, devices and media having computer-executable instructions as well as computer-implemented methods and other methods according to the present disclosure are considered to be within the scope of subject matter deemed patentable in accordance with Section 101 of Title 35 of the United States Code.

Skew detection system 130 may be configured to generate skew detection signal 132 based upon any of a variety of detections and/or measurements that are facilitated and/or enabled by flight control surface actuation system 100. In some examples, and as schematically illustrated in FIGS. 2-6, skew detection system 130 includes a skew lanyard 134 that is operatively coupled to each of a plurality of control surface segments 40 of flight control surface 22. Stated differently, in such examples, and as schematically illustrated in FIGS. 2-6, flight control surface 22 includes a plurality of control surface segments 40 such that skew lanyard 134 is operatively coupled to each control surface segment 40 of a skew lanyard subset 42 of the plurality of control surface segments 40. In such examples, and as schematically illustrated in FIGS. 2-6, skew detection system 130 additionally includes a detection mechanism assembly (DMA) 140 that is configured to detect a lanyard displacement 136 (schematically illustrated in FIGS. 4-6) of skew lanyard 134 and to generate a lanyard displacement signal 142 (schematically illustrated in FIGS. 4-5) that at least partially represents lanyard displacement 136. In such examples, skew detection signal 132 may include and/or be lanyard displacement signal 142.

Skew lanyard 134 may include and/or be any of a variety of structures, examples of which include a flexible lanyard and/or a flexible cable. Skew lanyard subset 42 may represent any suitable subset of control surface segments 40. For example, skew lanyard subset 42 may include each control surface segment 40 of flight control surface 22, or may include fewer than all control surface segments 40 of flight control surface 22.

In some examples, skew lanyard 134 is operatively coupled to each control surface segment 40 of skew lanyard subset 42 such that, when flight control surface 22 is in the nominal condition, skew lanyard 134 moves at least substantially in unison with skew lanyard subset 42 as flight control surface 22 transitions between the retracted position and the extended position. For example, and as schematically illustrated in FIGS. 2-5, skew lanyard 134 may be operatively coupled to DMA 140, and skew lanyard 134 may be fixedly coupled to at least one control surface segment 40 of skew lanyard subset 42 at a lanyard anchor 60. In such examples, skew lanyard 134 may extend between lanyard anchor 60 and DMA 140 such that skew lanyard 134 is operatively supported by skew lanyard subset 42.

In some examples, and as schematically illustrated in FIGS. 2-5, DMA 140 is operatively coupled to and/or supported by a corresponding control surface segment 40 of skew lanyard subset 42, while lanyard anchor 60 is operatively coupled to and/or supported by a different corresponding control surface segment 40 of skew lanyard subset 42. While FIGS. 2-5 schematically illustrate an example in which DMA 140 is positioned proximate to fuselage 12 relative to lanyard anchor 60, this is not required of all examples of skew detection system 130, and it is additionally within the scope of the present disclosure that lanyard anchor 60 may be positioned proximate to fuselage 12 relative to DMA 140.

Figure 5:
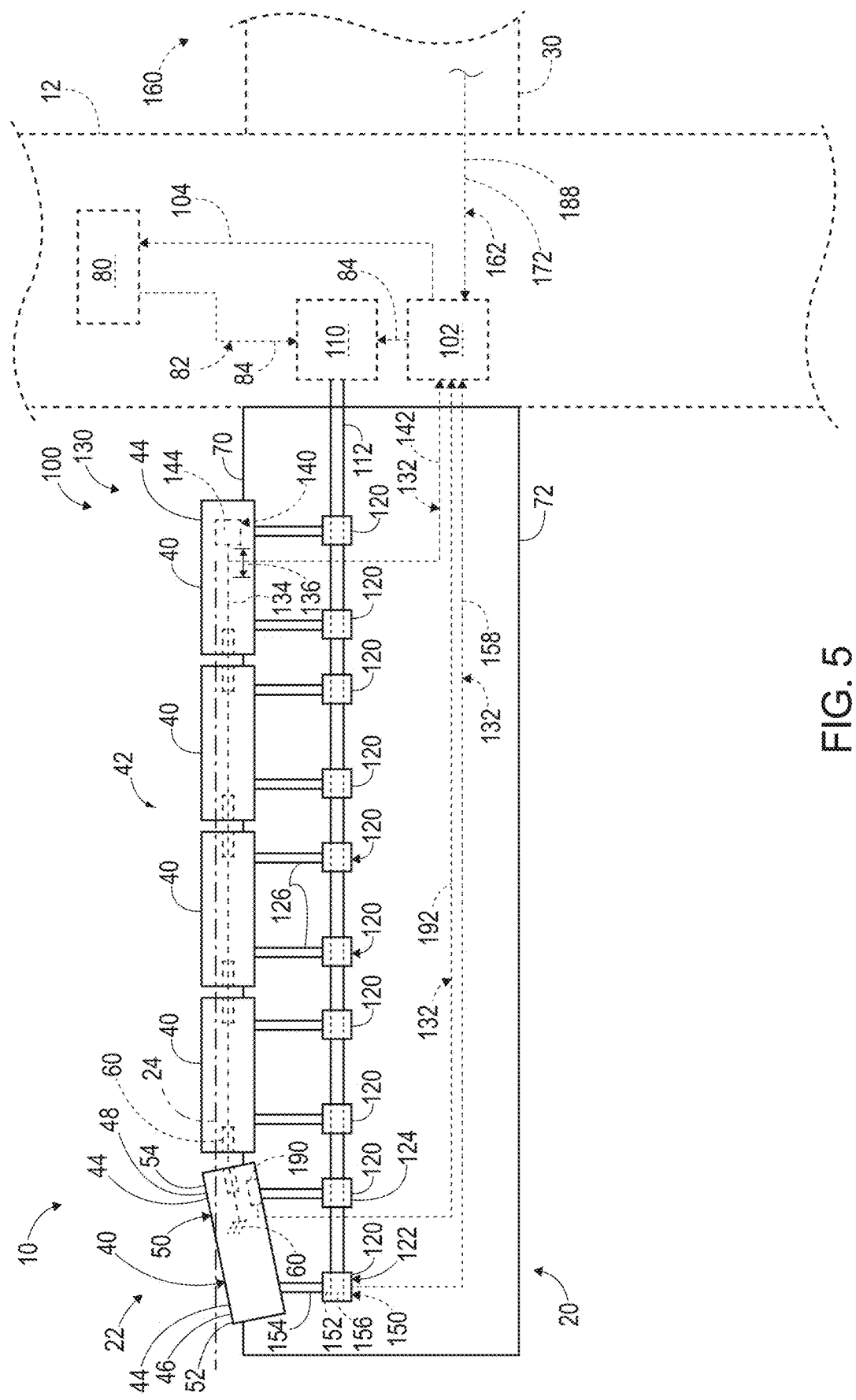
FIG. 5 is a schematic top plan view illustrating examples of flight control surface actuation systems utilized in conjunction with a flight control surface in a skew condition according to the present disclosure.
Figure 6:
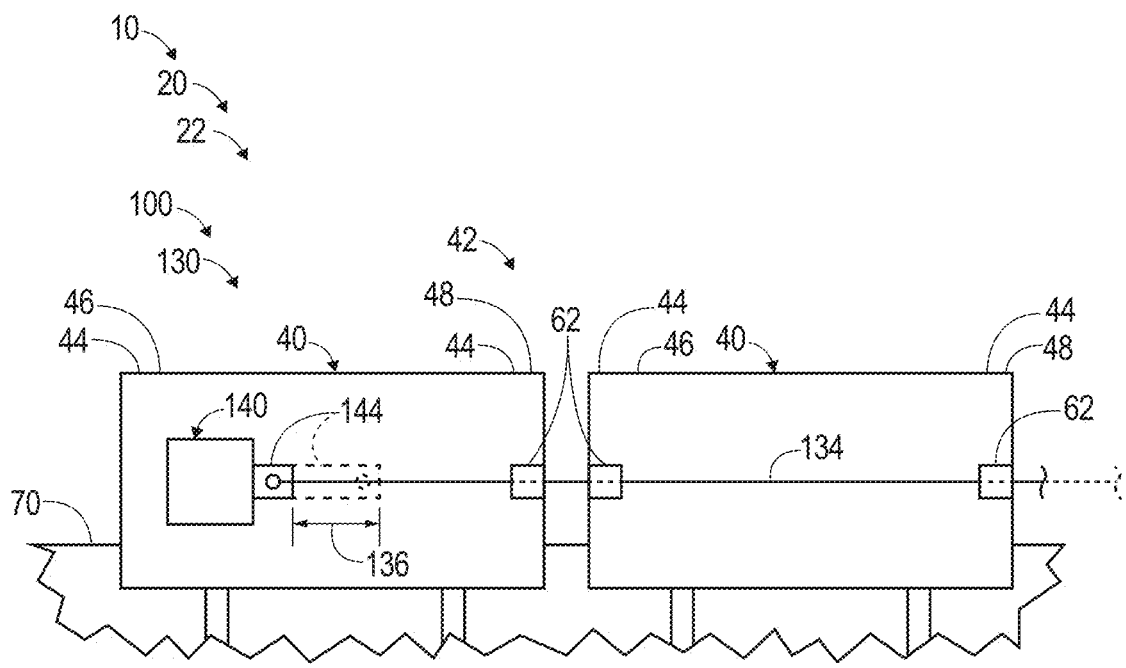
FIG. 6 is a schematic fragmentary top plan view illustrating an example of a portion of a flight control surface actuation system that includes a skew lanyard and a detection mechanism assembly according to the present disclosure.

In some examples, and as schematically illustrated in FIGS. 2-6, skew lanyard 134 is operatively coupled to first segment end 46 and/or second segment end 48 of each control surface segment 40 of skew lanyard subset 42. More specifically, and as schematically illustrated in FIGS. 2, 4, and 6, each control surface segment 40 of skew lanyard subset 42 may include at least one lanyard guide 62, such as may be associated with and/or positioned proximate to first segment end 46 or second segment end 48, and skew lanyard 134 may be slidingly received within and/or coupled to each lanyard guide 62. Stated differently, in such examples, skew lanyard 134 may extend between lanyard anchor 60 (schematically illustrated in FIGS. 2 and 4) and DMA 140 via each lanyard guide 62. Lanyard guide 62 may include and/or be any of a variety of structures suitable for guiding and/or retaining skew lanyard 134, examples of which include a groove, a channel, an eyelet, etc.

FIGS. 2-3 schematically illustrate an example in which flight control surface 22 is in the nominal condition such that skew lanyard 134 remains at least substantially stationary relative to each control surface segment 40 of skew lanyard subset 42 as flight control surface 22 transitions between the retracted position (FIG. 2) and the extended position (FIG. 3). By contrast, and as discussed, FIG. 4 schematically represents an example in which flight control surface 22 is in the skew condition. In particular, and as schematically illustrated in FIG. 4, when flight control surface 22 is in the skew condition, a misalignment of at least one control surface segment 40 relative to at least one other control surface segment 40 may yield and/or correspond to an increased separation distance between respective lanyard guides 62 of adjacent control surface segments 40 (relative to a corresponding separation distance when flight control surface 22 is in the nominal condition). This increased separation distance thus may increase a distance of a path between lanyard anchor 60 and DMA 140 and through each lanyard guide 62 along which skew lanyard 134 extends. Because skew lanyard 134 is at least substantially fixed at lanyard anchor 60, the onset of the skew condition thus requires that skew lanyard 134 move (e.g., translate) relative to DMA 140 by lanyard displacement 136, such as may correspond to the increased separation distance between adjacent lanyard guides 62. In this manner, a measurement of a position of skew lanyard 134 relative to DMA 140, such as via a measurement of lanyard displacement 136, enables the identification of the skew condition in flight control surface 22. More specifically, and as discussed, DMA 140 is configured to generate lanyard displacement signal 142 that at least partially represents lanyard displacement 136 such that lanyard displacement signal 142 may be utilized to identify the presence and/or magnitude of the skew condition. In particular, in the example of FIG. 4, a measurement of lanyard displacement 136 enables identification of the skew condition in flight control surface 22 when flight control surface 22 is in a freewheeling skew condition.

DMA 140 may be configured to generate lanyard displacement signal 142 in any of a variety of manners. In some prior art examples that utilize a skew lanyard similar to skew lanyard 134 and/or a DMA similar to DMA 140, such a prior art DMA may be configured to measure a change in the position of the skew lanyard via a proximity sensor, such as a proximity sensor that measures a proximity between a sensor and a target that moves relative to the sensor. In some such prior art examples, the target is coupled and/or affixed to the prior art skew lanyard, and the prior art DMA senses the position of the prior art lanyard via a measurement of the proximity of the target to the sensor. However, in such prior art systems, the proximity sensor only may be able to detect whether the separation distance separating the target and the sensor is less than a predetermined threshold minimum sensing distance and/or greater than a predetermined threshold maximum sensing distance. Thus, such prior art systems generally are configured to indicate that a measured displacement of the prior art skew lanyard relative to the prior art DMA corresponds to a skew condition of an associated flight control surface only if the lanyard displacement is greater than the predetermined threshold maximum sensing distance. Moreover, in such prior art examples, the prior art DMA may be configured such that the predetermined threshold maximum sensing distance is sufficiently large to distinguish skew conditions from other operative conditions that may produce a displacement of the prior art skew lanyard relative to the prior art DMA, such as wing bending, thermal effects, and/or natural stretching of the prior art skew lanyard over an operational lifetime thereof. Accordingly, such prior art systems may not be capable of detecting a skew condition with a small magnitude (e.g., corresponding to a lanyard displacement that is less than the predetermined threshold maximum sensing distance) and/or the onset of a skew condition that is increasing in magnitude. Additionally, in some prior art examples, the proximity sensor may exhibit hysteresis effects such that the predetermined threshold minimum sensing distance is less than the predetermined threshold maximum sensing distance, thus necessitating a larger predetermined threshold maximum sensing distance (and thus a less sensitive measurement of the skew condition) in order to produce an unambiguous displacement measurement, relative to a system in which the lanyard displacement may be measured directly.

In some examples, and in contrast with prior art skew lanyard/DMA systems, DMA 140 according to the present disclosure is configured such that lanyard displacement signal 142 indicates that lanyard displacement 136 is any of a plurality of values, such as any of a continuous plurality of values. In such examples, DMA 140 may be described as being an analog sensor, and/or as enabling an analog measurement of the magnitude of the skew condition of flight control surface 22. In this manner, skew detection systems 130 including skew lanyard 134 and DMA 140 according to the present disclosure may improve upon prior art skew detection systems by enabling a more precise determination of lanyard displacement 136, thereby enabling a more precise determination of the presence and/or magnitude of the skew condition in flight control surface 22. Additionally or alternatively, such systems may enable determination of lanyard displacements 136 that are smaller in magnitude relative to prior art skew lanyard/DMA systems, thus enabling identification of relatively minor skew conditions. In this manner, skew detection systems 130 according to the present disclosure may enable detection of the skew condition before the skew condition progresses to a magnitude that drives undesirable forces into flight control surface 22 and/or wing 20.

DMA 140 may include any of a variety of structures and/or mechanisms for enabling analog sensing of lanyard displacement 136. In some examples, and as schematically illustrated in FIGS. 2-6, DMA 140 includes an analog position sensor 144 for detecting lanyard displacement 136. In such examples, analog position sensor 144 may include and/or be any suitable sensor for producing an analog measurement of lanyard displacement 136, examples of which include a rotary position sensor, a rotary electrical transformer, a linear variable differential transformer, a rotary variable differential transformer, and/or a resolver. In some such examples, analog position sensor 144 is configured to generate lanyard displacement signal 142 and/or to transmit lanyard displacement signal 142 to controller 102.

FIG. 6 schematically illustrates an example of a portion of flight control surface actuation system 100 that includes DMA 140 and skew lanyard 134 in combination with a portion of flight control surface 22. In particular, FIG. 6 schematically illustrates a portion of flight control surface 22 that includes a pair of control surface segments 40, each of which is a member of skew lanyard subset 42 of flight control surface 22, and each of which is in the extended configuration. As schematically illustrated in FIG. 6, skew lanyard 134 may be operatively coupled to DMA 140 such that analog position sensor 144 detects lanyard displacement 136 as skew lanyard 134 is urged from a nominal position (schematically illustrated in solid lines) to a displaced position (schematically illustrated in dashed lines), such as due to a skew condition in another portion of flight control surface 22. In some examples, and as schematically illustrated in FIG. 6, skew lanyard 134 is directly coupled to analog position sensor 144 such that a displacement of skew lanyard 134 (e.g., relative to control surface segment 40 and/or another portion of DMA 140) yields a corresponding displacement and/or motion of analog position sensor 144. A measurement of the corresponding displacement and/or motion of analog position sensor 144 thus may enable DMA 140 to produce an analog measurement of lanyard displacement 136, as described herein.

In some examples, skew detection system 130 additionally or alternatively may be configured to detect the presence and/or magnitude of a skew condition in flight control surface 22 at least partially via measurement of the segment end position of at least one segment end 44 of a corresponding control surface segment 40 of flight control surface 22. More specifically, in some examples, and as schematically illustrated in FIGS. 2-5 and 7, skew detection system 130 includes a hybrid sensing actuator 150 that includes a gear train 152 operatively coupled to driveline 112 and an actuator output 154 operatively coupled to the respective segment end 44 of the corresponding control surface segment 40 to drive the respective segment end 44 between the stowed position and the deployed position. In such examples, and as schematically illustrated in FIGS. 2-5 and 7, hybrid sensing actuator 150 further includes an actuator output position sensor 156 that is configured to generate an actuator output position signal 158 that indicates a position of actuator output 154.

Figure 7:
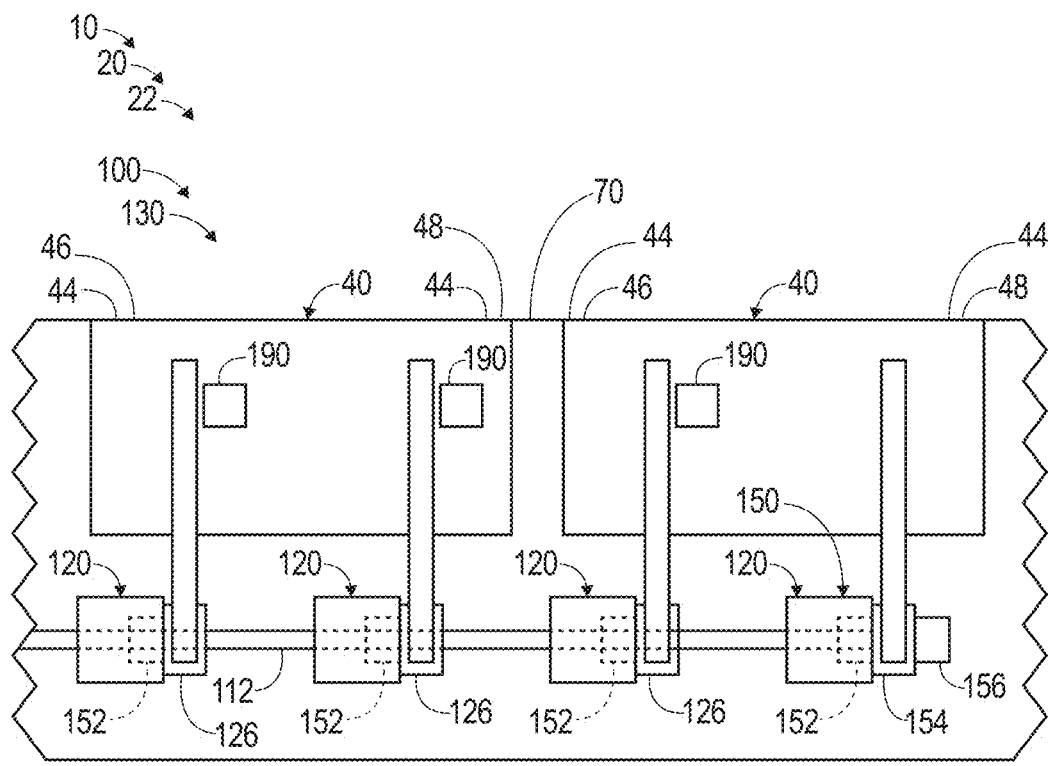
FIG. 7 is a schematic fragmentary top plan view illustrating an example of a portion of a flight control surface actuation system that includes a hybrid sensing actuator according to the present disclosure.

In some examples, and as schematically illustrated in FIGS. 2-5 and 7, at least one control surface actuator 120 of flight control surface actuation system 100 includes and/or is hybrid sensing actuator 150. Stated differently, each and/or any control surface actuator 120 of flight control surface actuation system 100 may be hybrid sensing actuator 150. As more specific examples, flight control surface actuation system 100 may include a plurality of control surface actuators 120, and some and/or all control surface actuators 120 of the plurality of control surface actuators 120 each may include and/or be hybrid sensing actuator 150. In this manner, hybrid sensing actuator 150 may be described as being an example of control surface actuator 120. Similarly, hybrid sensing actuator 150 may include and/or exhibit any structures, components, and/or functions of any other control surface actuator 120, and vice-versa. For example, actuator output 154 of hybrid sensing actuator 150 may be described as representing an example of actuator output 126. As another example, and as schematically illustrated in FIG. 7, each control surface actuator 120 of flight control surface actuation system 100 may include a respective gear train 152. In an example in which skew detection system 130 includes hybrid sensing actuator 150, and as schematically illustrated in FIGS. 2-5, skew detection signal 132 may include and/or be actuator output position signal 158.

Hybrid sensing actuator 150 may exhibit any of a variety of structures and/or configurations for indicating a position of actuator output 154 with actuator output position sensor 156. For example, in some examples, actuator output position sensor 156 is directly coupled to actuator output 154. As used herein, and similar to actuator output 126, actuator output 154 is intended to refer to and/or encompass any suitable structure and/or mechanism that conveys a mechanical output of hybrid sensing actuator 150 (and/or of any other corresponding control surface actuator 120) to control surface segment 40 and/or segment end 44 thereof. As examples, actuator output 154 may include and/or be a pinion gear, a lead screw, a jack screw, a rotary linkage, a linear linkage, etc. Additionally, as used herein, the term "position," as used to describe a state and/or configuration of actuator output 154, is intended to refer to any of a variety of states and/or configurations that correspond to the segment end position of the respective segment end 44 that is driven by actuator output 154. In this manner, as used herein, the position of actuator output 154 generally may be understood as directly corresponding to the segment end position of the respective segment end 44.

In some examples, the position of actuator output 154 is a rotational position of actuator output 154. For example, gear train 152 may be configured to transmit torque from driveline 112 to actuator output 154 to drive the respective segment end 44 between the stowed position and the deployed position. In some such examples, gear train 152 is configured to rotate actuator output 154 responsive to rotation of driveline 112. More specifically, in such examples, gear train 152 may be configured to rotate actuator output 154 with a rotational velocity that is less than a rotational velocity of driveline 112. For example, driveline 112 may be configured to rotate with a rotational velocity of several hundred revolutions per minute (RPM), and gear train 152 may have an effective gear ratio such that actuator output 154 rotates through less than about one full revolution as hybrid sensing actuator 150 drives the respective segment end 44 between the stowed position and the deployed position.

While the present disclosure generally relates to examples in which actuator output position sensor 156 detects a rotational position of actuator output 154, this is not required of all examples of skew detection system 130 and/or of hybrid sensing actuator 150. For example, in other examples, actuator output position sensor 156 may be configured to detect a linear position of actuator output 154, and/or actuator output position signal 158 may be configured to indicate the linear position of actuator output 154.

Hybrid sensing actuator 150 may be utilized in conjunction with any suitable segment end 44 of any suitable control surface segment 40 of flight control surface 22. In some examples, hybrid sensing actuator 150 may be utilized within a region of wing 20 in which size and/or space restrictions limit the use of alternative skew detection mechanisms. As a more specific example, and as schematically illustrated in FIGS. 2 and 5, control surface segment(s) 40 of flight control surface 22 may include an outboard control surface segment 50 that is distal fuselage 12 (e.g., relative to each other control surface segment 40), which in turn may include an outboard segment end 52 that is distal fuselage 12 and an inboard segment end 54 that is proximal fuselage 12 relative to outboard segment end 52. In such examples, and as schematically illustrated in FIGS. 2 and 5, one of first segment end 46 and second segment end 48 of outboard control surface segment 50 is outboard segment end 52, and the other of first segment end 46 and second segment end 48 of outboard control surface segment 50 is inboard segment end 54. In some such examples, and as schematically illustrated in FIGS. 2 and 5, hybrid sensing actuator 150 is operatively coupled to outboard segment end 52 of outboard control surface segment 50, such as may correspond to a region of wing 20 in which spatial constraints limit the use of alternative traditional skew detection systems.

In some examples, detecting the position of actuator output 154 with actuator output position sensor 156 enables and/or facilitates the determination of multiple aspects of a state of flight control surface actuation system 100. For example, hybrid sensing actuator 150 may be configured such that actuator output position signal 158 at least partially represents the driveline position of driveline 112. Stated differently, in such examples, because the position of actuator output 154 directly corresponds with the driveline position of driveline 112 (via the effective gear ratio of gear train 152), a measurement of the position of actuator output 154 correspondingly enables a determination of the driveline position of driveline 112. Such a configuration may be preferable to prior art systems in which the driveline position of the prior art driveline is measured via a position sensor that is directly coupled to the driveline. For example, in such a prior art system, the prior art position sensor may be coupled to the prior art driveline via an input shaft dynamic seal that may experience wear as a result of the relatively high rotational speed of the prior art driveline relative to the dynamic seal. By contrast, because actuator output position sensors 156 according to the present disclosure are operatively coupled to actuator output 154 rather than to driveline 112 (other than via gear train 152), a dynamic seal separating a portion of actuator output 154 from a portion of actuator output position sensor 156 may experience reduced wear as a result of the relatively small rotational velocity of actuator output 154 compared to that of driveline 112.

In some examples, actuator output position sensor 156 additionally or alternatively may be configured to facilitate the identification of the skew condition within flight control surface 22. In particular, because actuator output position sensor 156 measures the position of actuator output 154, which in turn corresponds to the segment end position of the respective segment end 44 of the corresponding control surface segment 40, actuator output position sensor 156 may facilitate determining the segment configuration of the corresponding control surface segment 40. As a more specific example, and as schematically illustrated in FIGS. 2-5 and 7, skew detection system 130 may include a segment end skew sensor 190 that is configured to detect the segment end position of a respective segment end 44 of a corresponding control surface segment 40. In such examples, and as schematically illustrated in FIGS. 2-5, segment end skew sensor 190 is configured to generate and transmit a segment end skew signal 192 that at least partially represents the segment end position of the respective segment end 44. In some such examples, and as schematically illustrated in FIGS. 2-5 and 7, segment end skew sensor 190 and hybrid sensing actuator 150 operate to at least partially detect the respective segment end positions of respective segment ends 44 of a common (e.g., the same) control surface segment 40. For example, and as schematically illustrated in FIGS. 2-5 and 7, hybrid sensing actuator 150 may be configured to detect the segment end position of first segment end 46 of control surface segment 40 and segment end skew sensor 190 may be configured to detect the segment end position of second segment end 48 of control surface segment 40, or vice-versa. In such examples, a comparison of the respective segment end positions as detected by hybrid sensing actuator 150 and segment end skew sensor 190, such as via a comparison of actuator output position signal 158 and segment end skew signal 192, may enable a determination of the presence and/or magnitude of a skew condition in control surface segment 40. For example, when actuator output position signal 158 and segment end skew signal 192 indicate that first segment end 46 and second segment end 48 are in distinct segment positions, skew detection system 130 may indicate that flight control surface 22 is in the skew condition as a result of control surface segment 40 having a segment configuration that differs from the target configuration. In such examples, segment end skew sensor 190 may include and/or be any of a variety of sensors for sensing a segment end position as described herein, examples of which include a position sensor, a rotary position sensor, a linear position sensor, and/or a proximity sensor.

FIG. 7 schematically illustrates an example of a portion of flight control surface actuation system 100 that includes hybrid sensing actuator 150 in combination with a portion of flight control surface 22. In particular, FIG. 7 schematically illustrates a portion of flight control surface 22 that includes a pair of control surface segments 40, each of which is in the retracted configuration. In the example of FIG. 7, each segment end 44 of each control surface segment 40 is operatively coupled to a respective control surface actuator 120, one of which is hybrid sensing actuator 150. In particular, and as schematically illustrated in FIG. 7, each control surface actuator 120 includes a respective gear train 152 that is operatively coupled to a respective actuator output 126 to drive the respective segment end 44 between the retracted configuration and the extended configuration. In the example of FIG. 7, skew detection system 130 includes a plurality of segment end skew sensors 190, each of which is configured to detect the segment end position of a respective segment end 44 as described herein and/or in any conventional manner. However, in contrast with each segment end skew sensor 190, and as schematically illustrated in FIG. 7, actuator output position sensor 156 of hybrid sensing actuator 150 may be directly coupled to actuator output 154 of hybrid sensing actuator 150 to detect the position of actuator output 154, thereby enabling detection of both the segment end position of the corresponding segment end 44 and the driveline position of driveline 112, as described herein.

Figure 8:
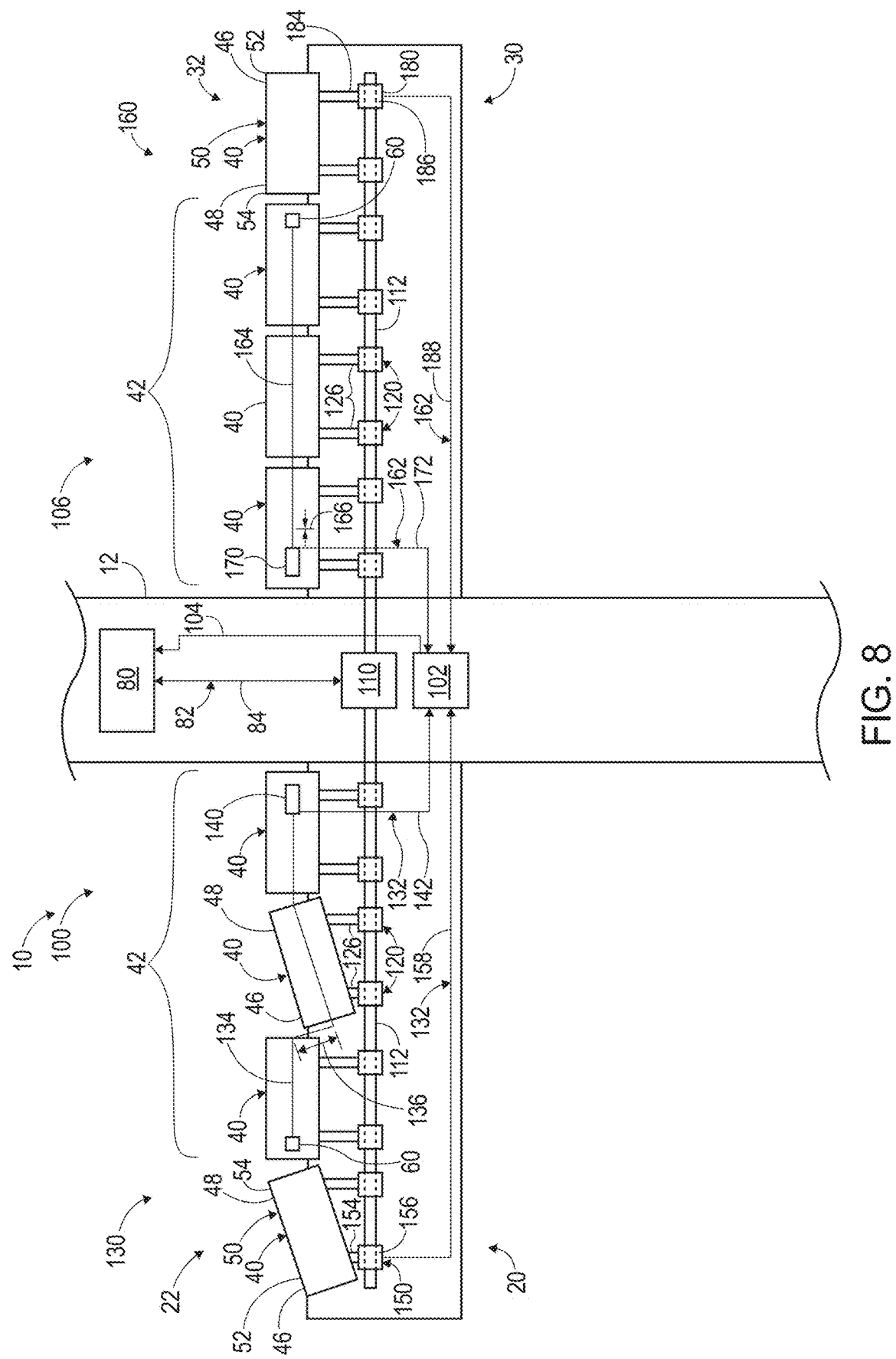
FIG. 8 is a schematic top plan view illustrating examples of vehicles including a first flight control surface actuation system and a second flight control surface actuation system according to the present disclosure.

In some examples, actuator output position sensor 156 may be configured to facilitate identification of the skew condition within flight control surface 22 via a comparison with a control surface segment 40 other than the corresponding control surface segment 40 with which hybrid sensing actuator 150 is associated. As an example, FIG. 8 schematically illustrates an example of a vehicle 10 including a first wing 20 and a second wing 30 extending from fuselage 12 such that first wing 20 incudes a first flight control surface 22 and second wing 30 includes a second flight control surface 32. In this manner, first wing 20, first flight control surface 22, and/or any components thereof of FIG. 8 may include and/or be wing 20, flight control surface 22, and/or any components thereof of FIGS. 2-7.

As schematically illustrated in FIG. 8, each of first flight control surface 22 and second flight control surface 32 includes one or more respective control surface segments 40, as discussed herein. In the example of FIG. 8, flight control surface actuation system 100 is a first flight control surface actuation system 100 with a first skew detection system 130, and vehicle 10 additionally includes a second flight control surface actuation system 106 for operating second flight control surface 32. As schematically illustrated in FIG. 8, second flight control surface actuation system 106 includes a second skew detection system 160.

Second flight control surface actuation system 106 and/or second skew detection system 160 may include any suitable systems, structures, and/or components, such as may be similar to, analogous to, and/or identical to systems, structures, and or components of first flight control surface actuation system 100 and/or first skew detection system 130. For example, and as schematically illustrated in FIG. 8, second skew detection system 160 may include a second skew lanyard 164 and a second DMA 170 that is configured to generate a second lanyard displacement signal 172 that at least partially represents a second lanyard displacement 166 of second skew lanyard 164. In such examples, skew lanyard 134, lanyard displacement 136, DMA 140, and/or lanyard displacement signal 142 may be referred to as a first skew lanyard 134, a first lanyard displacement 136, a first DMA 140, and/or a first lanyard displacement signal 142, respectively. In such examples, second skew lanyard 164, second lanyard displacement 166, second DMA 170, and/or second lanyard displacement signal 172 may share any and/or all applicable structural and/or functional attributes with first skew lanyard 134, first lanyard displacement 136, first DMA 140, and/or first lanyard displacement signal 142, respectively.

Additionally or alternatively, in some examples, first flight control surface actuation system 100 may share one or more components with second flight control surface actuation system 106. As a more specific example, and as schematically illustrated in FIG. 8, controller 102 and/or power drive unit 110 as described above in conjunction with first flight control surface actuation system 100 may be included in, and/or shared between, each of first flight control surface actuation system 100 and second flight control surface actuation system 106.

In the example of FIG. 8, second skew detection system 160 is configured to detect a skew condition in second flight control surface 32 and to generate a second skew detection signal 162 that represents the skew condition of second flight control surface 32. In such examples, and as schematically illustrated in FIG. 8, controller 102 may be configured to receive first skew detection signal 132 from first skew detection system 130 and to receive second skew detection signal 162 from second skew detection system 160. Accordingly, in such examples, controller 102 may be configured to generate skew condition signal 104 at least partially based upon each of first skew detection signal 132 and second skew detection signal 162, such as via a comparison of first skew detection signal 132 and second skew detection signal 162.

In some examples, and as schematically illustrated in FIG. 8, second skew detection system 160 includes a second hybrid sensing actuator 180 with a second actuator output 184 and a second actuator output position sensor 186 configured to generate a second actuator output position signal 188 that indicates a position of second actuator output 184. In such examples, hybrid sensing actuator 150 of first skew detection system 130 may be described as a first hybrid sensing actuator 150, and actuator output position signal 158 may be described as a first actuator output position signal 158. In such examples, second hybrid sensing actuator 180 may include and/or exhibit any components, features, functionality, etc. of hybrid sensing actuator 150 of first skew detection system 130. In the example of FIG. 8, first hybrid sensing actuator 150 is operatively coupled to outboard segment end 52 of outboard control surface segment 50 of first flight control surface 22, and second hybrid sensing actuator 180 similarly is operatively coupled to outboard segment end 52 of outboard control surface segment 50 of second flight control surface 32. In this manner, first hybrid sensing actuator 150 and second hybrid sensing actuator 180 may be described as being symmetrically arranged relative to fuselage 12. Additionally, in such examples, a comparison of first actuator output position signal 158 and second actuator output position signal 188 may enable and/or facilitate identifying the skew condition in first flight control surface 22 (and/or in second flight control surface 32). For example, in the example of FIG. 8, first actuator output position signal 158 may indicate that outboard segment end 52 of outboard control surface segment 50 of first flight control surface 22 is in the stowed position (or in another position other than the deployed position) while second actuator output position signal 188 may indicate that outboard segment end 52 of outboard control surface segment 50 of second flight control surface 32 is in the deployed position. Such an inconsistency thus may indicate that first flight control surface 22 is in the skew condition.

In some examples, and as schematically illustrated in FIGS. 2-5 and 8, skew detection systems 130 according to the present disclosure (e.g., first skew detection system 130 and/or second skew detection system 160) may include hybrid sensing actuator 150 in combination with skew lanyard 134 and DMA 140 as described herein. For example, FIG. 8 schematically illustrates an example in which first skew detection system 130 and second skew detection system 160 include first hybrid sensing actuator 150 and second hybrid sensing actuator 180, respectively, and in which each of first skew detection system 130 and second skew detection system 160 additionally includes a respective skew lanyard 134 and a respective DMA 140. In the example of FIG. 8, each of first flight control surface 22 and second flight control surface 32 is commanded to be in the extended position (such as by flight control unit 80), while first flight control surface 22 is in the skew condition as a result of each of two control surface segments 40 being in a segment configuration that does not match the target configuration (namely, the extended configuration). In such an example, the presence and/or magnitude of the skew condition of first flight control surface 22 may be determined via comparison of first actuator output position signal 158 and second actuator output position signal 188, as described above, and/or via a measurement of lanyard displacement 136 by DMA 140 of first skew detection system 130.

In some examples, hybrid sensing actuator 150 and skew lanyard 134 may be associated with a common (e.g., the same) control surface segment 40. For example, and as schematically illustrated in FIGS. 2-5, skew lanyard 134 may be operatively coupled to inboard segment end 54 of outboard control surface segment 50 (labeled in FIGS. 2 and 5), while hybrid sensing actuator 150 may be operatively coupled to outboard segment end 52 of outboard control surface segment 50. However, this is not required. For example, and as schematically illustrated in FIG. 8, it is additionally within the scope of the present disclosure that hybrid sensing actuator 150 may be operatively coupled to a control surface segment 40 that is not in skew lanyard subset 42 of control surface segments 40.

Figure 9:
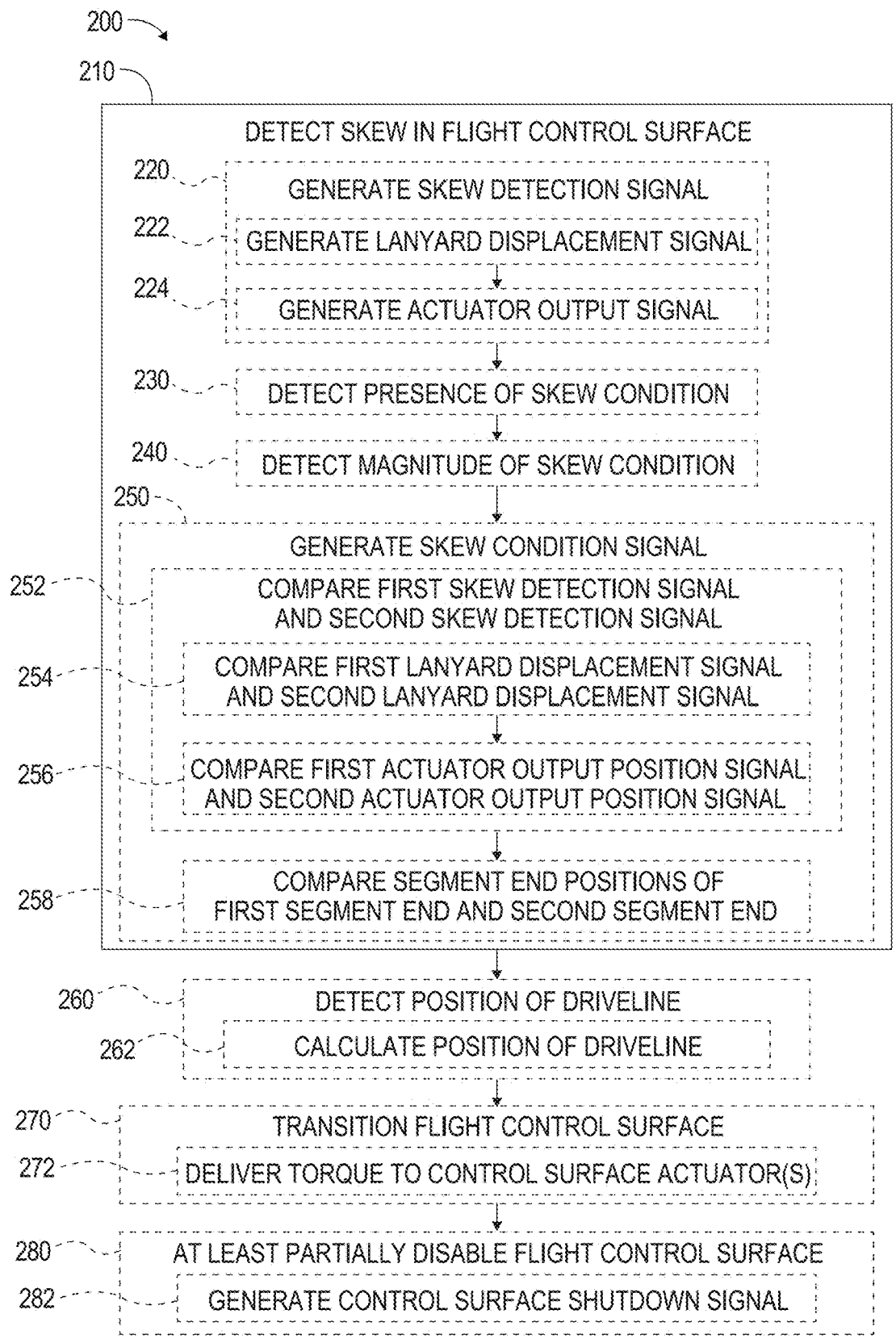
FIG. 9 is a flowchart depicting examples of methods, according to the present disclosure, of utilizing a flight control surface actuation system to operate a flight control surface.

FIG. 9 represents a flowchart depicting methods 200, according to the present disclosure, of utilizing a flight control surface actuation system to operate a flight control surface of a wing of a vehicle. Examples of vehicles, wings, flight control surfaces, and/or flight control surface actuation systems as utilized in methods 200 are disclosed herein with reference to vehicle 10, wing 20, flight control surface 22, and/or flight control surface actuation system 100, respectively. As shown in FIG. 9, methods 200 include detecting, at 210 and with the flight control surface actuation system, the skew condition in the flight control surface. The detecting the skew condition at 210 may be performed in any of a variety of manners utilizing the systems and components disclosed herein.

In some examples, and as shown in FIG. 9, the detecting the skew condition at 210 includes generating, at 220, a skew detection signal and generating, at 250, a skew condition signal. In such examples, the generating the skew detection signal at 220 is performed with at least a portion of a skew detection system, such as skew detection system 130 described herein, while the generating the skew condition signal at 250 is performed with a controller and at least partially based upon the skew detection signal. Examples of controllers, skew condition signals, and/or skew detection signals as utilized in methods 200 are disclosed herein with reference to controller 102, skew condition signal 104, and/or skew detection signal 132, respectively.

In some more specific examples, and as shown in FIG. 9, the generating the skew detection signal at 220 includes generating, at 222, a lanyard displacement signal. In such examples, the generating the lanyard displacement signal at 222 is performed with a DMA, such as DMA 140 described herein. Examples of the lanyard displacement signals as utilized in methods 200 are disclosed herein with reference to lanyard displacement signal 142. Additionally or alternatively, in some examples, and as shown in FIG. 9, the generating the skew detection signal at 220 includes generating, at 224, an actuator output position signal. In such examples, the generating the actuator output position signal at 224 is performed with an actuator output position sensor, such as actuator output position sensor 156 of hybrid sensing actuator 150 as described herein. Examples of actuator output position signals as utilized in methods 200 are described herein with reference to actuator output position signal 158.

The generating the skew condition signal at 250 may include generating such that the skew condition signal represents any of a variety of properties and/or details regarding the skew condition of the flight control surface. In some examples, the generating the skew condition signal at 250 includes generating such that the skew condition signal includes an indication of a present condition of the flight control surface, such as an identification of whether the flight control surface is in the skew condition or in the nominal condition as described herein. Additionally or alternatively, the generating the skew condition signal at 250 may include generating such that the skew condition signal includes an indication of a magnitude of the skew condition signal in the flight control surface. For example, in an example in which a control surface segment of the flight control surface is misaligned with a control surface axis of the flight control surface, the generating the skew condition signal at 250 may include generating such that the skew condition signal indicates that the flight control surface is in the skew condition as a result of the misalignment of the control surface segment. Additionally or alternatively, in such an example, the generating the skew condition signal at 250 may include generating such that the skew condition signal indicates a magnitude of the skew condition that corresponds to an angular deviation between the control surface segment and the control surface axis. In other examples, the magnitude of the skew condition of the flight control surface may correspond to, and/or be equal to, a lanyard displacement of a skew lanyard associated with the flight control surface. Examples of control surface segments, control surface axes, skew lanyards, and/or lanyard displacements that may be utilized in conjunction with methods 200 are described herein with reference to control surface segment 40, control surface axis 24, skew lanyard 134, and/or lanyard displacement 136, respectively.

Similarly, in some examples, and as shown in FIG. 9, the detecting the skew condition at 210 includes detecting, at 230, the presence of the skew condition in the flight control surface and/or detecting, at 240, the magnitude of the skew condition in the flight control surface. As a more specific example, such as in an example in which the skew condition signal represents the lanyard displacement of the skew lanyard, the detecting the presence of the skew condition at 230 and/or the detecting the magnitude of the skew condition at 240 may include detecting that a lanyard displacement signal indicates that the lanyard displacement is greater than a predetermined threshold displacement. Examples of lanyard displacement signals that may be utilized in conjunction with methods 200 are described herein with reference to lanyard displacement signal 142.

As a more specific example, in an example in which the skew detection system utilizes a skew lanyard as described herein, the detecting the presence of the skew condition at 230 may include detecting that the flight control surface is in the skew condition only if the lanyard displacement of the skew lanyard is greater than a displacement that could be accounted for by nominal operational factors such as wing flexing, thermal effects, stretching of the skew lanyard, etc. In this manner, comparing the lanyard displacement to the predetermined lanyard displacement may ensure that the detecting the presence of the skew condition at 230 accurately identifies the skew condition. Additionally, in such examples, the detecting the presence of the skew condition at 230 may include detecting that the flight control surface is in the skew condition only if the lanyard displacement of the skew lanyard remains greater than the predetermined lanyard displacement for a period of time in excess of a predetermined dwell time interval. In this manner, the detecting the presence of the skew condition at 230 may include distinguishing the skew condition from operational factors that result in transient skew lanyard displacements.

In some examples, the generating the skew condition signal at 250 includes generating the skew condition signal at least partially based upon an actuator output position signal produced by a hybrid sensing actuator of the flight control surface actuation system. Examples of hybrid sensing actuators and/or actuator output position signals that may be utilized in methods 200 are described herein with reference to hybrid sensing actuator 150 and/or skew condition signal 104, respectively. In some more specific examples, and as discussed above, the hybrid sensing actuator is operatively coupled to the first segment end or the second segment end of the corresponding control surface segment, and the hybrid sensing actuator is configured to generate an actuator output position signal that at least partially represents the segment end position of the first segment end or the second segment end to which the hybrid sensing actuator is operatively coupled. Examples of the first segment end, the second segment end, and/or the actuator output position signal as utilized in methods 200 are described herein with reference to first segment end 46, second segment end 48, and/or actuator output position signal 158, respectively. In some such examples, the skew detection system additionally is configured to detect the segment end position of the segment end (e.g., the first segment end or the second segment end) opposite the end to which the hybrid sensing actuator is coupled, such as via a segment end skew sensor such as segment end skew sensor 190 described herein. In some such examples, and as shown in FIG. 9, the generating the skew condition signal at 250 includes comparing, at 258, the segment end position of the first segment end and the segment end position of the second segment end of the corresponding surface segment to which the hybrid sensing actuator is operatively coupled. As a more specific example, the generating the skew condition signal at 250 may include generating such that the skew condition signal indicates that the flight control surface is in the skew condition when a difference between the respective segment end positions of the first segment end and the second segment end is greater than a threshold operational segment end offset. In such examples, the threshold operational segment end offset may be determined and/or selected to be sufficiently large to distinguish the skew condition from other operational circumstances that may lead to the first segment end and the second segment end having distinct segment positions.

In some examples, the generating the skew condition signal at 250 includes comparing sensor signals associated with each of a pair of wings. Specifically, in some examples, the vehicle includes a first wing with a first flight control surface configured to be operated by a first flight control surface actuation system as well as a second wing with a second flight control surface configured to be operated with a second flight control surface actuation system. Examples of the first wing, the first flight control surface, and/or the first flight control surface actuation system that may be utilized in conjunction with methods 200 are described herein with reference to first wing 20, first flight control surface 22, and/or first flight control surface actuation system 100, respectively. Similarly, examples of the second wing, the second flight control surface, and/or the second flight control surface actuation system that may be utilized in conjunction with methods 200 are described herein with reference to second wing 30, second flight control surface 32, and/or second flight control surface actuation system 106, respectively. In such examples, the first flight control surface actuation system may include a first skew detection system, such as skew detection system 130 described herein, which is configured to generate a first skew detection signal, such as first skew detection signal 132 described herein. Similarly, in such examples, the second flight control surface actuation system may include a second skew detection system, such as second skew detection system 160 described herein, which is configured to generate a second skew detection signal, such as second skew detection signal 162 described herein. More specifically, in such examples, and as described herein, the second skew detection system is configured to detect a skew condition in the second flight control surface, and the second skew detection signal represents the skew condition of the second flight control surface. In some such examples, and as discussed in more detail below, the generating the skew condition signal at 250 includes generating at least partially based upon each of the first skew detection signal and the second skew detection signal. More specifically, in some such examples, and as shown in FIG. 9, the generating the skew condition signal at 250 includes comparing, at 252, the first skew detection signal and the second skew detection signal.

In some examples, the comparing the first skew detection signal and the second skew detection signal at 252 includes comparing the respective skew displacements of respective skew lanyards associated with each of the first flight control surface and the second flight control surface. More specifically, in some examples, the first skew detection signal includes and/or is a first lanyard displacement signal that indicates a first lanyard displacement of a first skew lanyard of the first skew detection system, and the second skew detection signal includes and/or is a second lanyard displacement signal that indicates a second lanyard displacement of a second skew lanyard of the second skew detection system. In some such examples, the first skew detection system includes a first DMA for generating the first skew detection signal, and the second skew detection system includes a second DMA for generating the second skew detection signal. In some such examples, and as shown in FIG. 9, the comparing the first skew detection signal and the second skew detection signal at 252 includes and/or is comparing, at 254, the first lanyard displacement signal and the second lanyard displacement signal. Examples of the first skew lanyard, the first lanyard displacement, the first lanyard displacement signal, the first DMA, the second skew lanyard, the second lanyard displacement, the second lanyard displacement signal, and/or the second DMA that may be utilized in conjunction with methods 200 are described herein with reference to first skew lanyard 134, first lanyard displacement 136, first lanyard displacement signal 142, first DMA 140, second skew lanyard 164, second lanyard displacement 166, second lanyard displacement signal 172, and/or second DMA 170, respectively.

The comparing the first lanyard displacement signal and the second lanyard displacement signal at 254 may include comparing in any of a variety of manners. In some examples, the comparing the first lanyard displacement signal and the second lanyard displacement signal at 254 includes calculating a lanyard displacement difference between the first lanyard displacement and the second lanyard displacement and comparing the lanyard displacement difference to a threshold lanyard displacement difference. As a more specific example, the generating the skew condition signal at 250 may include generating such that the skew condition signal indicates the presence of the skew condition in the first flight control surface responsive to the comparing the first lanyard displacement signal and the second lanyard displacement signal at 254 indicating that the first lanyard displacement exceeds the second lanyard displacement by at least the threshold lanyard displacement difference. For example, in an operational circumstance in which each of the first wing and the second wing flexes, such as in response to a common aerodynamic load shared by both wings, such a flexing may yield a displacement of each of the first skew lanyard and the second skew lanyard relative to the first DMA and the second DMA, respectively. Accordingly, in such a circumstance, the first lanyard displacement distance and the second lanyard displacement distance each may be nonzero, even when no skew condition is present in the first flight control surface or in the second flight control surface. However, in such a circumstance, the lanyard displacement difference may remain smaller than the threshold lanyard displacement difference. Thus, the comparing the first lanyard displacement signal and the second lanyard displacement signal at 254 may assist in distinguishing a measured lanyard displacement that is associated with a skew condition from a measured lanyard displacement that results from an external force affecting both of the first wing and the second wing. Accordingly, in such examples, the threshold lanyard displacement distance may be determined and/or selected at least partially based upon an expected magnitude, or an expected variance in the expected magnitude, of a lanyard displacement that may be attributed to factors other than a skew condition.

In some examples, the comparing the first skew detection signal and the second skew detection signal at 252 includes comparing skew detection signals associated with respective hybrid sensing actuators. More specifically, in some examples, the first skew detection signal includes and/or is a first actuator output position signal generated by a first hybrid sensing actuator of the first skew detection system, and the second skew detection system includes a second hybrid sensing actuator configured to generate a second actuator position signal such that the second skew detection signal includes and/or is the second actuator position signal. In such examples, the first hybrid sensing actuator includes a first actuator output position sensor for generating the first actuator output position signal that represents a position of a first actuator output. Similarly, in such examples, the second hybrid sensing actuator includes a second actuator output position sensor for generating the second actuator output position signal that represents a position of a second actuator output. In some such examples, and as shown in FIG. 9, the comparing the first skew detection signal and the second skew detection signal at 252 includes comparing, at 256, the first actuator output position signal and the second actuator output position signal. Examples of the first hybrid sensing actuator, the first actuator output, the first actuator output position sensor, and/or the first actuator output position signal as utilized in methods 200 are described herein with reference to first hybrid sensing actuator 150, first actuator output 154, first actuator output position sensor 156, and/or first actuator output position signal 158, respectively. Examples of the second hybrid sensing actuator, the second actuator output, the second actuator output position sensor, and/or the second actuator output position signal as utilized in methods 200 are described herein with reference to second hybrid sensing actuator 180, second actuator output 184, second actuator output position sensor 186, and/or second actuator output position signal 188, respectively.

In some more specific examples, the first hybrid sensing actuator is operatively coupled to a first corresponding control surface segment (such as control surface segment 40 as described herein) of the first flight control surface, and the second hybrid sensing actuator is operatively coupled to a second corresponding control surface segment (such as control surface segment 40 as described herein) of the second flight control surface. In some examples, the first corresponding control surface segment and the second corresponding control surface segment are at least substantially symmetrically arranged relative to the fuselage. For example, the first corresponding control surface segment may be an outboard control surface segment (such as outboard control surface segment 50) of the first flight control surface, and the second corresponding surface segment may be an outboard control surface segment (such as outboard control surface segment 50) of the second flight control surface. As a more specific example, and as discussed above in the context of FIG. 8, the first hybrid sensing actuator may be operatively coupled to an outboard segment end (such as outboard segment end 52 as described herein) of the first corresponding control surface segment, and the second hybrid sensing actuator may be operatively coupled to an outboard segment end (such as outboard segment end 52 as described herein) of the second corresponding control surface segment. However, such configurations are not required of all examples of methods 200. For example, it is additionally within the scope of the present disclosure that the first corresponding control surface segment and the second corresponding control surface segment may be any of a variety of respective control surface segments, such as respective inboard control surface segments of the first flight control surface and the second flight control surface. In some such examples, the comparing the first actuator output position signal and the second actuator output position signal at 256 includes calculating an actuator output difference between the position of the first actuator output and the position of the second actuator output and comparing the actuator output difference to a threshold actuator output difference.

Additionally or alternatively, in some examples, the generating the skew condition signal at 250 may include indicating the presence of the skew condition if the position of the first actuator output is changing more rapidly or less rapidly than the position of the second actuator output. More specifically, in some examples, the generating the skew condition signal at 250 includes generating such that the skew condition signal indicates the presence of the skew condition in the first flight control surface responsive to the comparing the first actuator output position signal and the second actuator output position signal at 256 indicating that the position of the second actuator output is changing more rapidly than the position of the first actuator output. In particular, such a circumstance may arise in a condition in which each of the first hybrid sensing actuator and the second hybrid sensing actuator receives a respective torque for transitioning the respective control surface segments between the retracted configuration and the extended configuration, but the first hybrid sensing actuator has ceased to transmit the torque to the first actuator output, potentially yielding the skew condition in the first flight control surface.

In some examples, and as shown in FIG. 9, methods 200 additionally include detecting, at 260, a driveline position of a driveline of the flight control surface actuation system (such as driveline 112 of flight control surface actuation system 100) at least partially based on the actuator output position signal generated by a hybrid sensing actuator. More specifically, in some examples, and as discussed above in conjunction with hybrid sensing actuator 150, the hybrid sensing actuator is configured to detect and/or measure a position of the corresponding actuator output (such as actuator output 154) to inform a determination of a skew condition in the flight control surface and/or to represent a position of the driveline. Accordingly, in some such examples, the actuator output position signal generated by the hybrid sensing actuator indicates the rotational position of the actuator output, such as may be measured in revolutions relative to an initial and/or nominal state. In some such examples, and as shown in FIG. 9, the detecting the driveline position at 260 includes calculating, at 262, the driveline position at least partially based upon the rotational position of the actuator output and/or on a gear ratio of a gear train of the hybrid sensing actuator (such as gear train 152). More specifically, in such examples, and as discussed, the rotational position of the actuator output may be directly related to the rotational position of the driveline via the effective gear ratio of the gear train. Thus, in such examples, the calculating the driveline position at 262 may include multiplying the rotational position of the actuator output by the effective gear ratio of the gear train. In various examples, methods 200 and/or steps thereof that include manipulation of signals and/or information, such as the calculating the driveline position at 262 and/or the multiplying the rotational position of the actuator output by the gear ratio of the drive train, may be performed by the controller of the flight control surface actuation system.

In some examples, methods 200 additionally include one or more steps for operating the flight control surface, such as to modify an operational configuration of the flight control surface. More specifically, in some examples, and as shown in FIG. 9, methods 200 additionally include transitioning, at 270, the flight control surface between the retracted configuration and the extended configuration. In some such examples, the transitioning the flight control surface between the retracted configuration and the extended configuration is at least partially performed by a flight control unit, such as flight control unit 80 of vehicle 10. In some examples, and as shown in FIG. 9, the transitioning the flight control surface at 270 include delivering, at 272, a torque to each of a plurality of control surface actuators associated with the flight control surface, thereby actuating each control surface actuator to transition each of a respective plurality of segment ends of each corresponding control surface segment between the stowed position and the deployed position. In some examples, the delivering the torque to each control surface actuator at 272 includes generating the torque in the driveline of the flight control surface actuation system, such as with a power drive unit of the flight control surface actuation system. Examples of control surface actuators as utilized in methods 200 are described herein with reference to control surface actuator 120 and/or hybrid sensing actuator 150. Examples of segment ends as utilized in methods 200 are described herein with reference to segment end 44, first segment end 46, second segment end 48, outboard segment end 52, and/or inboard segment end 54. Examples of power drive units as utilized in methods 200 are described herein with reference to power drive unit 110.

As discussed, flight control surface actuation systems 100 and methods 200 according to the present disclosure generally are directed to detecting a skew condition in a flight control surface such that operation of the vehicle may be appropriately modified to account for the skew condition.

Accordingly, in some examples, the transitioning the flight control surface at 270 is performed only if the skew condition signal indicates that the flight control surface is in the nominal condition and/or if the skew condition signal indicates that the magnitude of the skew condition of the flight control surface is less than a threshold operational skew magnitude. Stated differently, the flight control surface actuation system may be configured to transition the flight control surface between the retracted configuration and the extended configuration only if the flight control surface is not in the skew condition, or only if the magnitude of the skew condition is less than the predetermined threshold operational skew magnitude. In this manner, the flight control surface actuation system may be configured to avoid exacerbating a skew condition, such as by continuing to drive one segment end of a control surface segment while another segment end of the control surface segment is restricted from moving, which may lead to a jammed condition.

In some examples, and as shown in FIG. 9, methods 200 additionally or alternatively include at least partially disabling, at 280, the flight control surface, such as in response to detection of a skew condition. Accordingly, in such examples, the at least partially disabling the flight control surface at 280 is performed responsive to the skew condition signal indicating the that flight control surface is in the skew condition and/or that the magnitude of the skew condition in the flight control surface is greater than the threshold operational skew magnitude. The at least partially disabling the flight control surface at 280 may include any of a variety of steps and/or processes, such as to protect the flight control surface and/or the wing from damage. In some examples, the at least partially disabling the flight control surface at 280 includes ceasing the delivering the torque to each control surface actuator at 272, such as by commanding the power drive unit to cease delivering torque to the driveline. More specifically, in some examples, and as shown in FIG. 9, the at least partially disabling the flight control surface at 280 includes generating, at 282, a control surface shutdown signal (such as control surface shutdown signal 84 described herein) and transmitting the control surface shutdown signal to the power drive unit to cease generating the torque in the driveline. In such examples, the generating the control surface shutdown signal at 282 may be performed by the controller and/or by the flight control unit.

In some examples, the at least partially disabling the flight control surface at 280 additionally or alternatively includes transitioning the flight control surface toward a configuration that mitigates or eliminates the skew condition. As a more specific example, the detecting the presence of the skew condition at 230 and/or the detecting the magnitude of the skew condition at 240 may indicate that the skew condition is initially detected, or detected to increase in magnitude, as the flight control surface transitions toward the extended configuration. Accordingly, in some such examples, the at least partially disabling the flight control surface at 280 includes transitioning the flight control surface toward and/or to the retracted configuration. As another example, the detecting the presence of the skew condition at 230 and/or the detecting the magnitude of the skew condition at 240 may indicate that the skew condition is initially detected, or detected to increase in magnitude, as the flight control surface transitions toward the retracted configuration. Accordingly, in some such examples, the at least partially disabling the flight control surface at 280 includes transitioning the flight control surface toward and/or to the extended configuration. In such examples, transitioning the flight control surface toward the retracted configuration or the extended configuration may operate to enhance alignment between the control surface segments of the flight control surface, thereby reducing the magnitude of the skew condition and/or returning the flight control surface to the nominal configuration.

While the scope of protection is determined by the appended claims, realizations of the present disclosure can be made in many ways including, but not limited to, those according to the following paragraphs:

A1. A flight control surface actuation system (100) for operating a flight control surface (22) of a wing (20) of a vehicle (10), the flight control surface (22) comprising one or more control surface segments (40), and the flight control surface actuation system (100) comprising:

a control surface actuator (120) configured to be operatively coupled to a corresponding control surface segment (40) of the one or more control surface segments (40) and configured to transition the corresponding control surface segment (40) among a plurality of segment configurations defined between and including a retracted configuration and an extended configuration, optionally wherein the control surface actuator (120) includes an actuator output (126) that is configured to be operatively coupled to the corresponding control surface segment (40); and a skew detection system (130) configured to detect a skew condition in the flight control surface (22).

A2. The flight control surface actuation system (100) of paragraph A1, further comprising one or both of:

(i) a driveline (112) operatively coupled to the control surface actuator (120) and configured to actuate the control surface actuator (120); and a power drive unit (110) configured to generate a torque in the driveline (112) to selectively actuate the control surface actuator (120).

A3. The flight control surface actuation system (100) of paragraph A2, wherein the skew detection system (130) is configured to detect a driveline position of the driveline (112), wherein the driveline position includes, and optionally is, a rotational position of the driveline (112).

A4. The flight control surface actuation system (100) of any of paragraphs A2-A3, wherein the driveline (112) comprises one or more torque tubes (114) configured to rotate at least substantially in unison.

A5. The flight control surface actuation system (100) of paragraph A4, wherein the one or more torque tubes (114) comprises a plurality of torque tubes (114); and wherein the control surface actuator (120) is operatively coupled to each of a corresponding pair of torque tubes (114) of the plurality of torque tubes (114).

A6. The flight control surface actuation system (100) of any of paragraphs A1-A5, wherein the flight control surface (22) is configured to transition among a plurality of control surface positions defined between and including a retracted position, in which each control surface segment (40) of the one or more control surface segments (40) is in the retracted configuration, and an extended position, in which each control surface segment (40) of the one or more control surface segments (40) is in the extended configuration.

A7. The flight control surface actuation system (100) of any of paragraphs A1-A6, wherein the control surface actuator (120) is one of a plurality of control surface actuators (120) of the flight control surface actuation system (100); wherein each control surface actuator (120) of the plurality of control surface actuators (120) is configured to be operatively coupled to a respective segment end (44) of the corresponding control surface segment (40) of the one or more control surface segments (40) and is configured to transition the respective segment end (44) among a plurality of segment end positions defined between and including a stowed position and a deployed position; and optionally wherein a/the driveline (112) is operatively coupled to each control surface actuator (120) of the plurality of control surface actuators (120) and is and configured to actuate each control surface actuator (120) of the plurality of control surface actuators (120).

A8. The flight control surface actuation system (100) of paragraph A7, wherein the corresponding control surface segment (40) is in the retracted configuration when each respective segment end (44) of the corresponding control surface segment (40) is in the stowed position; and wherein the corresponding control surface segment (40) is in the extended configuration when each respective segment end (44) of the corresponding control surface segment (40) is in the deployed position.

A9. The flight control surface actuation system (100) of any of paragraphs A7-A8, wherein the respective segment end (44) is one of a first segment end (46) of the corresponding control surface segment (40) or a second segment end (48) of the corresponding control surface segment (40) that is opposite the first segment end (46) of the corresponding control surface segment (40).

A10. The flight control surface actuation system (100) of any of paragraphs A7-A9, wherein each respective segment end (44) of each corresponding control surface segment (40) of the one or more control surface segments (40) is configured to move at least substantially in unison with each other respective segment end (44) of each corresponding control surface segment (40) of the one or more control surface segments (40) as the flight control surface (22) transitions between the retracted position and the extended position and when the flight control surface (22) is in a nominal condition; and wherein, when the flight control surface (22) is in the skew condition, at least one respective segment end (44) of at least one corresponding control surface segment (40) of the one or more control surface segments (40) has a segment end position that is different than a segment end position of at least one other respective segment end (44) of at least one corresponding control surface segment (40) of the one or more control surface segments (40).

A11. The flight control surface actuation system (100) of paragraph A10, when dependent from paragraph A6, wherein a/the first segment end (46) and a/the second segment end (48) of each corresponding control surface segment (40) of the one or more control surface segments (40) are configured to move at least substantially in unison as the flight control surface (22) transitions between the retracted position and the extended position and when the flight control surface (22) is in the nominal condition.

A12. The flight control surface actuation system (100) of any of paragraphs A1-A11, further comprising a controller (102) configured to generate a skew condition signal (104) that represents one or both of:

(i) a presence of the skew condition in the flight control surface (22); and (ii) a magnitude of the skew condition in the flight control surface (22).

A13. The flight control surface actuation system (100) of any of paragraphs A1-A12, wherein the skew detection system (130) is configured to generate a skew detection signal (132) that at least partially represents the skew condition of the flight control surface (22).

A14. The flight control surface actuation system (100) of paragraph A13, when dependent from paragraph A12, wherein the skew detection system (130) is configured to transmit the skew detection signal (132) to the controller (102).

A15. The flight control surface actuation system (100) of any of paragraphs A13-A14, when dependent from paragraph A12, wherein the skew condition signal (104) is based, at least in part, on the skew detection signal (132).

A16. The flight control surface actuation system (100) of any of paragraphs A12-A15, wherein the vehicle (10) further comprises a flight control unit (80) configured to at least partially control the operation of the vehicle (10); and wherein the controller (102) is configured to transmit the skew condition signal (104) to the flight control unit (80).

A17. The flight control surface actuation system (100) of paragraph A16, wherein the flight control unit (80) is configured to generate and transmit a driveline control signal (82) to the power drive unit (110) to at least partially control the operation of the flight control surface (22).

A18. The flight control surface actuation system (100) of any of paragraphs A12-A17, wherein one or both of the controller (102) and a/the flight control unit (80) is configured to generate and transmit a control surface shutdown signal (84) to cease generating the torque in a/the driveline (112).

A19. The flight control surface actuation system (100) of paragraph A18, wherein a/the driveline control signal (82) includes, and optionally is, the control surface shutdown signal (84).

A20. The flight control surface actuation system (100) of any of paragraphs A1-A19, wherein each of the plurality of segment configurations defines a target orientation for the one or more control surface segments (40); and wherein, when the flight control surface (22) is in the skew condition, at least one control surface segment (40) of the one or more control surface segments (40) defines a skew orientation that differs from the target orientation.

A21. The flight control surface actuation system (100) of paragraph A20, wherein the skew orientation at least one of:
 (i) is rotated relative to the target orientation;
 (ii) is at least partially underdeployed relative to the target orientation; and
 (iii) is at least partially overdeployed relative to the target orientation.

A22. The flight control surface actuation system (100) of any of paragraphs A1-A21, when dependent from paragraph A7, wherein, when the flight control surface (22) is in the skew condition, the segment end position of at least one segment end (44) of at least one control surface segment (40) of the one or more control surface segments (40) is proximal to the stowed position relative to the segment end position of at least one other segment end (44) of at least one control surface segment (40) of the one or more control surface segments (40).

A23. The flight control surface actuation system (100) of any of paragraphs A1-A22, when dependent from paragraph A7, wherein the plurality of control surface actuators (120) includes a first control surface actuator (122) operatively coupled to the first segment end (46) of the corresponding control surface segment (40) and a second control surface actuator (124) operatively coupled to the second segment end (48) of the corresponding control surface segment (40); and wherein, when the flight control surface (22) is in the skew condition, one or both of the first control surface actuator (122) and the second control surface actuator (124) is at least partially disabled from operatively transitioning the respective segment end (44) between the stowed position and the deployed position.

A24. The flight control surface actuation system (100) of any of paragraphs A1-A23, wherein the flight control surface (22) extends along and defines a control surface axis (24); wherein each of the one or more control surface segments (40) extends at least substantially parallel to the control surface axis (24) when the flight control surface (22) is in the nominal condition; and wherein, when the flight control surface (22) is in the skew condition, at least one of the one or more control surface segments (40) is nonparallel with one or both of the control surface axis (24) and at least one other control surface segment (40) of the one or more control surface segments (40).

A25. The flight control surface actuation system (100) of any of paragraphs A1-A24, wherein the flight control surface (22) is positioned adjacent to, and optionally at least partially defines, a leading edge (70) of the wing (20).

A26. The flight control surface actuation system (100) of any of paragraphs A1-A25, wherein the flight control surface (22) includes, and optionally is, a leading edge flight control surface, optionally wherein the leading edge flight control surface is one of a slat or a Krueger panel.

A27. The flight control surface actuation system (100) of any of paragraphs A1-A26, wherein each control surface segment (40) of the one or more control surface segments (40) includes, and optionally is, a/the leading edge flight control surface.

A28. The flight control surface actuation system (100) of any of paragraphs A1-A27, wherein the flight control surface (22) is positioned adjacent to, and optionally at least partially defines, a trailing edge (72) of the wing (20).

A29. The flight control surface actuation system (100) of any of paragraphs A1-A28, wherein the flight control surface (22) includes, and optionally is, one or more of a flap, a flaperon, and an aileron.

A30. The flight control surface actuation system (100) of any of paragraphs A1-A29, wherein each control surface segment (40) of the one or more control surface segments (40) includes, and optionally is, one or more of a/the flap, a/the flaperon, and an/the aileron.

A31. The flight control surface actuation system (100) of any of paragraphs A1-A30, wherein the one or more control surface segments (40) includes a plurality of control surface segments (40); and wherein the skew detection system (130) comprises:
 a skew lanyard (134) configured to be operatively coupled to each control surface segment (40) of a skew lanyard subset (42) of the plurality of control surface segments (40); and
 a detection mechanism assembly (DMA) (140) configured to detect a lanyard displacement (136) of the skew lanyard (134) relative to a nominal configuration of the skew lanyard (134) and to generate a lanyard displacement signal (142) that at least partially represents the lanyard displacement (136);
 wherein the DMA (140) is configured such that the lanyard displacement signal (142) indicates that the lanyard displacement (136) is any of a plurality of values, optionally any of a continuous plurality of values.

A32. The flight control surface actuation system (100) of paragraph A31, when dependent from paragraph A13, wherein the skew detection signal (132) includes, and optionally is, the lanyard displacement signal (142).

A33. The flight control surface actuation system (100) of any of paragraphs A31-A32, wherein the skew lanyard (134) includes, and optionally is, a flexible lanyard, optionally a flexible cable.

A34. The flight control surface actuation system (100) of any of paragraphs A31-A33, wherein the skew lanyard subset (42) includes each control surface segment (40) of the plurality of control surface segments (40).

A35. The flight control surface actuation system (100) of any of paragraphs A31-A33, wherein the skew lanyard subset (42) includes fewer than all control surface segments (40) of the plurality of control surface segments (40).

A36. The flight control surface actuation system (100) of any of paragraphs A31-A35, wherein the skew lanyard (134) is configured to be operatively coupled to one or both of a/the first segment end (46) and a/the second segment end (48) of each control surface segment (40) of the skew lanyard subset (42).

A37. The flight control surface actuation system (100) of any of paragraphs A31-A36, wherein at least one control surface segment (40) of the skew lanyard subset (42) includes at least one lanyard guide (62); and wherein the skew lanyard (134) is slidingly coupled to each lanyard guide (62) of the at least one lanyard guide (62).

A38. The flight control surface actuation system (100) of any of paragraphs A31-A37, wherein the skew lanyard (134) is operatively coupled to the DMA (140).

A39. The flight control surface actuation system (100) of any of paragraphs A31-A38, wherein the skew lanyard (134) is fixedly coupled to at least one control surface segment (40) of the skew lanyard subset (42) at a lanyard anchor (60).

A40. The flight control surface actuation system (100) of paragraph A39, wherein the skew lanyard (134) extends between the lanyard anchor (60) and the DMA (140).

A41. The flight control surface actuation system (100) of any of paragraphs A31-A40, wherein the DMA (140) includes an analog position sensor (144) for detecting the lanyard displacement (136).

A42. The flight control surface actuation system (100) of paragraph A41, wherein the analog position sensor (144) includes, and optionally is, one or more of a rotary position sensor, a rotary electrical transformer, a linear variable differential transformer, a rotary variable differential transformer, and a resolver.

A43. The flight control surface actuation system (100) of any of paragraphs A41-A42, wherein the analog position sensor (144) is configured to generate the lanyard displacement signal (142), optionally wherein the analog position sensor (144) is configured to transmit the lanyard displacement signal (142) to a/the controller (102).

A44. The flight control surface actuation system (100) of any of paragraphs A1-A43, when dependent from paragraph A7, wherein the skew detection system (130) comprises a hybrid sensing actuator (150) that includes:
 a gear train (152) operatively coupled to the driveline (112);
 an actuator output (154) operatively coupled to the respective segment end (44) of the corresponding control surface segment (40) to drive the respective segment end (44) between the stowed position and the deployed position; and an actuator output position sensor (156) configured to generate an actuator output position signal (158) that indicates a position of the actuator output (154), optionally one or both of a rotational position of the actuator output (154) and a linear position of the actuator output (154);
 optionally wherein the control surface actuator (120) is the hybrid sensing actuator (150); and optionally wherein the actuator output (154) of the hybrid sensing actuator (150) is the actuator output (126) of the control surface actuator (120).

A45. The flight control surface actuation system (100) of paragraph A44, when dependent from paragraph A7, wherein at least one control surface actuator (120) of the plurality of control surface actuators (120) includes, and optionally is, the hybrid sensing actuator (150).

A46. The flight control surface actuation system (100) of any of paragraphs A44-A45, wherein a/the skew detection signal (132) includes, and optionally is, the actuator output position signal (158).

A47. The flight control surface actuation system (100) of any of paragraphs A44-A46, wherein the actuator output (154) includes, and optionally is, one or more of a pinion gear, a lead screw, a jack screw, a rotary linkage, and a linear linkage.

A48. The flight control surface actuation system (100) of any of paragraphs A44-A47, wherein the actuator output position sensor (156) is directly coupled to the actuator output (154).

A49. The flight control surface actuation system (100) of any of paragraphs A44-A48, wherein the gear train (152) is configured to transmit torque from the driveline (112) to the actuator output (154).

A50. The flight control surface actuation system (100) of any of paragraphs A44-A49, wherein the gear train (152) is configured to rotate the actuator output (154) responsive to rotation of the driveline (112), optionally to rotate the actuator output (154) with a rotational velocity that is less than a rotational velocity of the driveline (112).

A51. The flight control surface actuation system (100) of any of paragraphs A44-A50, when dependent from paragraph A3, wherein the hybrid sensing actuator (150) is configured such that the actuator output position signal (158) at least partially represents the driveline position, optionally wherein the actuator output position signal (158) at least partially represents the rotational position of the driveline (112).

A52. The flight control surface actuation system (100) of any of paragraphs A44-A51, wherein the skew detection system (130) further includes a segment end skew sensor (190) that is configured to detect a/the segment end position of a/the respective segment end (44) of the corresponding control surface segment (40); wherein the segment end skew sensor (190) is configured to generate and transmit a segment end skew signal (192) that at least partially represents the segment end position of the respective segment end (44); wherein the respective segment end (44) is one of a/the first segment end (46) and a/the second segment end (48) of the corresponding control surface segment (40); and wherein the actuator output (154) of the hybrid sensing actuator (150) is configured to be operatively coupled to the other of the first segment end (46) and the second segment end (48) of the corresponding control surface segment (40).

A53. The flight control surface actuation system (100) of paragraph A52, when dependent from paragraph A13, wherein the skew detection signal (132) includes the segment end skew signal (192).

A54. The flight control surface actuation system (100) of any of paragraphs A52-A53, wherein the segment end skew sensor (190) includes, and optionally is, one or more of a position sensor, a rotary position sensor, a linear position sensor, and a proximity sensor.

A55. The flight control surface actuation system (100) of any of paragraphs A44-A54, wherein the vehicle (10) further comprises a fuselage (12); wherein the wing (20) extends from the fuselage (12); wherein the one or more control surface segments (40) comprises an outboard control surface segment (50) that is distal the fuselage (12); wherein one of a/the first segment end (46) and a/the second segment end (48) of the outboard control surface segment (50) is an outboard segment end (52) that is distal the fuselage (12); wherein the other of the first segment end (46) and the second segment end (48) of the outboard control surface segment (50) is an inboard segment end (54) that is proximal the fuselage (12) relative to the outboard segment end (52); and wherein the hybrid sensing actuator (150) is configured to be operatively coupled to the outboard segment end (52) of the outboard control surface segment (50).

A56. The flight control surface actuation system (100) of any of paragraphs A44-A55, wherein the skew detection system (130) further comprises a/the skew lanyard (134) and a/the DMA (140).

A57. The flight control surface actuation system (100) of paragraph A56, wherein the skew lanyard (134) is configured to be operatively coupled to the inboard segment end (54) of the outboard control surface segment (50).

A58. The flight control surface actuation system (100) of any of paragraphs A1-A57, in combination with the flight control surface (22); wherein the control surface actuator (120) is operatively coupled to the corresponding control surface segment (40); and optionally wherein one or more of:
  (i) the actuator output (126) is operatively coupled to the corresponding control surface segment (40);
  (ii) each control surface actuator (120) of a/the plurality of control surface actuators (120) is be operatively coupled to a/the respective segment end (44);
  (iii) a/the skew lanyard (134) is operatively coupled to each control surface segment (40) of a/the skew lanyard subset (42) of the plurality of control surface segments (40);
  (iv) the skew lanyard (134) is operatively coupled to one or both of a/the first segment end (46) and a/the second segment end (48) of each control surface segment (40) of the skew lanyard subset (42);
  (v) an/the actuator output (154) of a/the hybrid sensing actuator (150) is operatively coupled to one of the first segment end (46) and the second segment end (48) of a/the corresponding control surface segment (40);
  (vi) the hybrid sensing actuator (150) is operatively coupled to an/the outboard segment end (52) of an/the outboard control surface segment (50); and
  (vii) the skew lanyard (134) is operatively coupled to an/the inboard segment end (54) of the outboard control surface segment (50).

B1. A vehicle (10), comprising:
a fuselage (12);
a wing (20) extending from the fuselage (12) and comprising a flight control surface (22) with one or more control surface segments (40); and
the flight control surface actuation system (100) of any of paragraphs A1-A58 for operating the flight control surface (22).

B2. The vehicle (10) of paragraph B1, wherein the vehicle (10) is an aircraft, optionally a fixed-wing aircraft.

B3. The vehicle (10) of any of paragraphs B1-B2, wherein the wing (20) is a first wing (20); wherein the flight control surface (22) is a first flight control surface (22); wherein the flight control surface actuation system (100) is a first flight control surface actuation system (100); wherein the skew detection system (130) is a first skew detection system (130); wherein a/the skew detection signal (132) is a first skew detection signal (132); wherein the vehicle (10) further comprises a second wing (30) extending from the fuselage (12) and comprising a second flight control surface (32) with one or more control surface segments (40) and a second flight control surface actuation system (106) for operating the second flight control surface (32); wherein the second flight control surface actuation system (106) includes a second skew detection system (160) configured to detect a skew condition in the second flight control surface (32); wherein the second skew detection system (160) is configured to generate a second skew detection signal (162) that represents the skew condition of the second flight control surface (32).

B4. The vehicle (10) of paragraph B3, wherein the second skew detection system (160) includes a second hybrid sensing actuator (180) with a second actuator output (184) and a second actuator output position sensor (186) configured to generate a second actuator output position signal (188) that indicates a position of the second actuator output (184).

B5. The vehicle (10) of paragraph B3, wherein a/the controller (102) is configured to receive the first skew detection signal (132) from the first skew detection system (130) and to receive the second skew detection signal (162) from the second skew detection system (160).

B6. The vehicle (10) of paragraph B5, wherein the controller (102) is configured to generate the skew condition signal (104) based, at least in part, on each of the first skew detection signal (132) and the second skew detection signal (162).

C1. A method (200) of utilizing the flight control surface actuation system (100) of any of paragraphs A1-A58 to operate a flight control surface (22) of a wing (20) of a vehicle (10), the method comprising:
detecting (210), with the flight control surface actuation system (100), the skew condition in the flight control surface (22).

C2. The method (200) of paragraph C1, wherein the detecting (210) the skew condition includes:
generating (220), with at least a portion of the skew detection system (130), the skew detection signal (132); and
generating (250), with a/the controller (102) and at least partially based upon the skew detection signal (132), a/the skew condition signal (104).

C3. The method (200) of paragraph C2, wherein the generating (220) the skew detection signal (132) includes, and optionally is, one or both of:
  (i) generating (222), with a/the DMA (140), a/the lanyard displacement signal (142); and
  (ii) generating (224), with an/the actuator output position sensor (156), an/the actuator output position signal (158).

C4. The method (200) of any of paragraphs C2-C3, wherein the generating (250) the skew condition signal (104) includes generating such that the skew condition signal (104) includes one or both of:
  (i) an indication of a present condition of the flight control surface (22), optionally wherein the present condition of the flight control surface (22) is one of the skew condition or the nominal condition; and optionally wherein the indication of the present condition of the flight control surface (22) is an indication of a presence of the skew condition in the flight control surface (22); and
  (ii) an indication of a/the magnitude of the skew condition in the flight control surface (22).

C5. The method (200) of any of paragraphs C1-C4, wherein the detecting (210) the skew condition includes one or both of:

(i) detecting (230) a/the presence of the skew condition in the flight control surface (22);

and detecting (240) a/the magnitude of the skew condition in the flight control surface (22).

C6. The method (200) of paragraph C5, wherein one or both of the detecting (230) the presence of the skew condition and the detecting (240) the magnitude of the skew condition includes detecting that a/the lanyard displacement signal (142) indicates a lanyard displacement (136) that is greater than a predetermined threshold displacement.

C7. The method (200) of any of paragraphs C2-C6, wherein the wing (20) is a/the first wing (20); wherein the flight control surface actuation system (100) is a/the first flight control surface actuation system (100); wherein the skew detection system (130) is a/the first skew detection system (130); wherein a/the skew detection signal (132) is a/the first skew detection signal (132); wherein the vehicle (10) further comprises a/the second wing (30) with a/the second flight control surface (32) and a/the second flight control surface actuation system (106) for operating the second flight control surface (32); wherein the second flight control surface actuation system (106) includes a/the second skew detection system (160) configured to detect a skew condition in the second flight control surface (32); wherein the second skew detection system (160) is configured to generate a/the second skew detection signal (162) that represents the skew condition of the second flight control surface (32); and wherein the generating (250) the skew condition signal (104) includes generating at least partially based upon each of the first skew detection signal (132) and the second skew detection signal (162).

C8. The method (200) of paragraph C7, wherein the generating (250) the skew condition signal (104) includes comparing (252) the first skew detection signal (132) and the second skew detection signal (162).

C9. The method (200) of paragraph C8, wherein the first skew detection signal (132) includes, and optionally is, a/the lanyard displacement signal (142); wherein a/the lanyard displacement (136) is a first lanyard displacement (136); wherein the lanyard displacement signal (142) is a first lanyard displacement signal (142); wherein the skew lanyard (134) is a first skew lanyard (134); wherein the DMA (140) is a first DMA (140); wherein the second skew detection system (160) includes a second skew lanyard (164) and a second DMA (170) configured to detect a second lanyard displacement (166) of the second skew lanyard (164) relative to a nominal configuration of the second skew lanyard (164) and to generate a second lanyard displacement signal (172) that at least partially represents the second lanyard displacement (166); and wherein the comparing (252) the first skew detection signal (132) and the second skew detection signal (162) includes, and optionally is, comparing (254) the first lanyard displacement signal (142) and the second lanyard displacement signal (172).

C10. The method (200) of paragraph C9, wherein the comparing (254) the first lanyard displacement signal (142) and the second lanyard displacement signal (172) includes calculating a lanyard displacement difference between the first lanyard displacement (136) and the second lanyard displacement (166) and comparing the lanyard displacement difference to a threshold lanyard displacement difference.

C11. The method (200) of paragraph C10, wherein the generating (250) the skew condition signal (104) includes generating such that the skew condition signal (104) indicates the presence of the skew condition in the first flight control surface (22) responsive to the comparing (254) the first lanyard displacement signal (142) and the second lanyard displacement signal (172) indicating that the first lanyard displacement (136) exceeds the second lanyard displacement (166) by at least the threshold lanyard displacement difference.

C12. The method (200) of any of paragraphs C2-C11, wherein the flight control surface actuation system (100) includes a/the hybrid sensing actuator (150); and wherein the generating (250) the skew condition signal (104) includes generating (250) the skew condition signal (104) at least partially based upon the actuator output position signal (158).

C13. The method (200) of paragraph C12, wherein the hybrid sensing actuator (150) is operatively coupled to one of a/the first segment end (46) and a/the second segment end (48) of the corresponding control surface segment (40); wherein the actuator output position signal (158) at least partially represents the segment end position of the one of the first segment end (46) and the second segment end (48); wherein the skew detection system (130) is configured to detect the segment end position of the other of the first segment end (46) and the second segment end (48); and wherein the generating (250) the skew condition signal (104) includes comparing (258) the segment end position of the first segment end (46) and the segment end position of the second segment end (48) of the corresponding control surface segment (40).

C14. The method (200) of paragraph C13, wherein the generating (250) the skew condition signal (104) includes generating such that the skew condition signal (104) indicates that the flight control surface (22) is in the skew condition when a difference between the segment end position of the first segment end (46) and the segment end position of the second segment end (48) is greater than a threshold operational segment end offset.

C15. The method (200) of any of paragraphs C12-C14, wherein the first skew detection signal (132) includes, and optionally is, a/the actuator output position signal (158); wherein the hybrid sensing actuator (150) is a first hybrid sensing actuator (150); wherein the actuator output (154) is a first actuator output (154); wherein the actuator output position sensor (156) is a first actuator output position sensor (156); wherein the actuator output position signal (158) is a first actuator output position signal (158) that indicates a/the position of the first actuator output (154); wherein the second skew detection system (160) includes a/the second hybrid sensing actuator (180) with a/the second actuator output (184) and a/the second actuator output position sensor (186) configured to generate a/the second actuator output position signal (188) that indicates a position of the second actuator output (184); and wherein the comparing (252) the first skew detection signal (132) and the second skew detection signal (162) includes, and optionally is, comparing (256) the first actuator output position signal (158) and the second actuator output position signal (188).

C16. The method (200) of paragraph C15, wherein the first hybrid sensing actuator (150) is operatively coupled to a first corresponding control surface segment (40) of the first flight control surface (22); and wherein the second hybrid sensing actuator (180) is operatively coupled to a second corresponding control surface segment (40) of the second flight control surface (32).

C17. The method (200) of paragraph C16, wherein the first corresponding control surface segment (40) and the second corresponding control surface segment (40) are at least substantially symmetrically arranged relative to a/the fuselage (12).

C18. The method (200) of any of paragraphs C16-C17, wherein each of the first corresponding control surface segment (40) and the second corresponding control surface segment (40) is an/the outboard control surface segment (50).

C19. The method (200) of any of paragraphs C16-C18, wherein the first hybrid sensing actuator (150) is operatively coupled to an/the outboard segment end (52) of the first corresponding control surface segment (40); and wherein the second hybrid sensing actuator (180) is operatively coupled to the outboard segment end (52) of the second corresponding control surface segment (40).

C20. The method (200) of any of paragraphs C15-C19, wherein the comparing (256) the first actuator output position signal (158) and the second actuator output position signal (188) includes:
  (i) calculating an actuator output difference between the position of the first actuator output (154) and the position of the second actuator output (184); and
  (ii) comparing the actuator output difference to a threshold actuator output difference.

C21. The method (200) of any of paragraphs C15-C20, wherein the generating (250) the skew condition signal (104) includes generating such that the skew condition signal (104) indicates the presence of the skew condition in the first flight control surface (22) responsive to the comparing (256) the first actuator output position signal (158) and the second actuator output position signal (188) indicating that the position of the second actuator output (184) is changing more rapidly than the position of the first actuator output (154).

C22. The method (200) of any of paragraphs C1-C21, further comprising detecting (260) a/the driveline position; wherein the detecting (260) the driveline position is based, at least in part, on an/the actuator output position signal (158).

C23. The method (200) of paragraph C22, wherein the actuator output position signal (158) indicates the rotational position of the actuator output (154), optionally as measured in revolutions; and wherein the detecting (260) the driveline position includes calculating (262), optionally with the controller (102), the driveline position based, at least in part, on one or both of the rotational position of the actuator output (154) and a gear ratio of the gear train (152).

C24. The method (200) of paragraph C23, wherein the calculating (262) the driveline position includes multiplying, with the controller, the rotational position of the actuator output (154) by the gear ratio of the gear train (152).

C25. The method (200) of any of paragraphs C1-C24, further comprising transitioning (270) the flight control surface (22) between the retracted configuration and the extended configuration.

C26. The method (200) of paragraph C25, wherein the transitioning (270) the flight control surface (22) is performed, at least in part, by a/the flight control unit (80).

C27. The method (200) of any of paragraphs C25-C26, when dependent from paragraph A7, wherein the transitioning (270) the flight control surface (22) includes delivering (272) a torque to each control surface actuator (120) of the plurality of control surface actuators (120) to transition each respective segment end (44) of each corresponding control surface segment (40) between the stowed position and the deployed position.

C28. The method (200) of paragraph C27, wherein the delivering (272) the torque to each control surface actuator (120) includes generating the torque in the driveline (112) with the power drive unit (110).

C29. The method (200) of any of paragraphs C27-C28, wherein the transitioning (270) the flight control surface (22) is performed only if one or both of:
  (i) the skew condition signal (104) indicates that the flight control surface (22) is in the nominal condition; and
  (ii) the skew condition signal (104) indicates that the magnitude of the skew condition in the flight control surface (22) is less than a threshold operational skew magnitude.

C30. The method (200) of any of paragraphs C2-C29, further comprising:
  at least partially disabling (280) the flight control surface (22);
  wherein the at least partially disabling (280) the flight control surface (22) is performed responsive to one or both of:
  (i) the skew condition signal (104) indicating that the flight control surface (22) is in the skew condition; and
  (ii) the skew condition signal (104) indicating that the magnitude of the skew condition in the flight control surface (22) is greater than a/the threshold operational skew magnitude.

C31. The method (200) of paragraph C30, wherein the at least partially disabling (280) the flight control surface (22) includes one or more of:
  (i) ceasing a/the delivering (272) the torque to each control surface actuator (120);
  (ii) transitioning the flight control surface (22) toward, and optionally to, the retracted configuration; and
  (iii) transitioning the flight control surface (22) toward, and optionally to, the extended configuration.

C32. The method (200) of paragraph C31, wherein the at least partially disabling (280) the flight control surface (22) includes generating (282) a/the control surface shutdown signal (84) and transmitting the control surface shutdown signal (84) to the power drive unit (110) to cease generating the torque in the driveline (112).

C33. The method (200) of paragraph C32, wherein the generating (282) the control surface shutdown signal (84) is performed by one or both of a/the controller (102) and a/the flight control unit (80).

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

As used herein, the terms "selective" and "selectively," when modifying an action, movement, configuration, or other activity of one or more components or characteristics of an apparatus, mean that the specific action, movement, configuration, or other activity is a direct or indirect result of one or more dynamic processes, as described herein. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order, concurrently, and/or repeatedly. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein and such inventive subject matter may find utility in apparatuses, systems, and/or methods that are not expressly disclosed herein.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method of utilizing a flight control surface actuation system to operate a flight control surface of a wing of a vehicle, wherein the flight control surface comprises one or more control surface segments, and wherein the flight control surface actuation system comprises:
　a control surface actuator configured to be operatively coupled to a corresponding control surface segment of the one or more control surface segments and configured to transition the corresponding control surface segment among a plurality of segment configurations defined between and including a retracted configuration and an extended configuration; and
　a skew detection system configured to detect a skew condition in the flight control surface;
　wherein the skew detection system is configured to generate a skew detection signal that at least partially represents the skew condition of the flight control surface; wherein the skew detection system comprises:
　　a skew lanyard configured to be operatively coupled to each control surface segment of a skew lanyard subset of the one or more control surface segments; and
　　a detection mechanism assembly (DMA) configured to detect a lanyard displacement of the skew lanyard relative to a nominal configuration of the skew lanyard and to generate a lanyard displacement signal that at least partially represents the lanyard displacement; wherein the DMA includes an analog position sensor for detecting the lanyard displacement;
　wherein the skew detection signal includes the lanyard displacement signal; wherein the DMA is configured such that the lanyard displacement signal indicates that the lanyard displacement is any of a continuous plurality of values; and wherein the analog position sensor is configured to generate the lanyard displacement signal;
　the method comprising:
　　detecting, with the flight control surface actuation system, a skew condition in the flight control surface, wherein the detecting the skew condition includes:
　　　generating, with the DMA of the flight control surface actuation system, the lanyard displacement signal; and
　　　generating, with a controller of the flight control surface actuation system and at least partially based upon the lanyard displacement signal, a skew condition signal that includes an indication of a magnitude of the skew condition in the flight control surface;
　wherein the wing is a first wing; wherein the flight control surface actuation system is a first flight control surface actuation system; wherein the flight control surface is a first flight control surface; wherein the skew detection system is a first skew detection system; wherein the skew lanyard is a first skew lanyard; wherein the DMA is a first DMA; wherein the lanyard displacement is a first lanyard displacement, wherein the lanyard displacement signal is a first lanyard displacement signal; wherein the vehicle further comprises a second wing with a second flight control surface and a second flight control surface actuation system for operating the second flight control surface; wherein the second flight control surface actuation system includes a second skew detection system configured to detect a skew condition in the second flight control surface; wherein the second skew detection system includes a second skew lanyard and a second DMA configured to detect a second lanyard displacement of the second skew lanyard relative to a nominal configuration of the second skew lanyard and to generate a second lanyard displacement signal that at least partially represents the second lanyard displacement;
　wherein the generating the skew condition signal includes comparing the first lanyard displacement signal and the second lanyard displacement signal; and
　wherein the comparing the first lanyard displacement signal and the second lanyard displacement signal includes calculating a lanyard displacement difference between the first lanyard displacement and the second lanyard displacement and comparing the lanyard displacement difference to a threshold lanyard displacement difference.

2. The method of claim 1, wherein the analog position sensor includes one or more of a rotary position sensor, a rotary electrical transformer, a linear variable differential transformer, a rotary variable differential transformer, and a resolver.

3. The method of claim 1, wherein the control surface actuator is one of a plurality of control surface actuators of the flight control surface actuation system; wherein each control surface actuator of the plurality of control surface actuators is configured to be operatively coupled to a respective segment end of the corresponding control surface segment of the one or more control surface segments and is configured to transition the respective segment end among a plurality of segment end positions defined between and including a stowed position and a deployed position; wherein the respective segment end is one of a first segment end of the corresponding control surface segment or a second segment end of the corresponding control surface segment that is opposite the first segment end of the corresponding control surface segment; and wherein the skew lanyard is configured to be operatively coupled to one or both of the first segment end and the second segment end of each control surface segment of the skew lanyard subset.

4. The method of claim 1, wherein the control surface actuator is operatively coupled to the corresponding control surface segment; and wherein the skew lanyard is operatively coupled to each control surface segment of the skew lanyard subset.

5. The method of claim 1, wherein the vehicle further comprises a fuselage;
　wherein the first wing and the second wing extend from the fuselage; and
　wherein the controller is configured to generate the skew condition signal.

6. The method of claim 5, wherein the first skew detection system is configured to generate a first skew detection signal that at least partially represents the skew condition of the first flight control surface; wherein the controller is configured to receive the first skew detection signal from the first skew detection system and to receive a second skew detection signal from the second skew detection system; and wherein the controller is configured to generate the skew condition signal based, at least in part, on each of the first lanyard displacement signal and the second lanyard displacement signal.

7. The method of claim 1, wherein the detecting the skew condition includes detecting the magnitude of the skew condition in the flight control surface; and wherein the detecting the magnitude of the skew condition includes detecting that the lanyard displacement signal indicates a lanyard displacement that is greater than a predetermined threshold displacement.

8. A method of utilizing a flight control surface actuation system to operate a flight control surface of a wing of a vehicle, wherein the flight control surface comprises one or more control surface segments, and wherein the flight control surface actuation system comprises:
  a plurality of control surface actuators, each control surface actuator configured to be operatively coupled to a respective segment end of a corresponding control surface segment of the one or more control surface segments and configured to transition the respective segment end among a plurality of segment end positions defined between and including a stowed position and a deployed position to transition the corresponding control surface segment among a plurality of segment configurations defined between and including a retracted configuration and an extended configuration;
  a driveline operatively coupled to each control surface actuator of the plurality of control surface actuators and configured to actuate each control surface actuator of the plurality of control surface actuators; and
  a skew detection system configured to detect a skew condition in the flight control surface; wherein the skew detection system is configured to generate a skew detection signal that at least partially represents the skew condition of the flight control surface; wherein the skew detection system comprises a hybrid sensing actuator that includes:
    a gear train operatively coupled to the driveline;
    an actuator output configured to be operatively coupled to the respective segment end of the corresponding control surface segment to drive the respective segment end between the stowed position and the deployed position; and
    an actuator output position sensor directly coupled to the actuator output and configured to generate an actuator output position signal that indicates one or both of a rotational position of the actuator output and a linear position of the actuator output;
  wherein the skew detection signal includes the actuator output position signal; and wherein at least one control surface actuator of the plurality of control surface actuators includes the hybrid sensing actuator;
the method comprising:
  detecting, with the flight control surface actuation system, a skew condition in the flight control surface; wherein the detecting the skew condition includes:
    generating, with the actuator output position sensor of the flight control surface actuation system, the actuator output position signal; and
    generating, with a controller of the flight control surface actuation system and at least partially based upon the actuator output position signal, a skew condition signal that includes one or both of:
      (i) an indication of a presence of the skew condition in the flight control surface; and
      (ii) an indication of a magnitude of the skew condition in the flight control surface; and
  detecting a driveline position of the driveline; wherein the detecting the driveline position is based, at least in part, on the actuator output position signal; wherein the actuator output position signal indicates the rotational position of the actuator output; and wherein the detecting the driveline position includes calculating the driveline position of the driveline based, at least in part, on one or both of the rotational position of the actuator output and a gear ratio of the gear train.

9. The method of claim 8, wherein the hybrid sensing actuator is configured such that the actuator output position signal at least partially represents a rotational position of the driveline.

10. The method of claim 8, wherein the vehicle further comprises, a fuselage;
  wherein the wing extends from the fuselage; and
  wherein each control surface actuator of the plurality of control surface actuators is operatively coupled to the respective segment end; wherein the actuator output is operatively coupled to the respective segment end.

11. The method of claim 10, wherein the wing is a first wing;
  wherein the flight control surface is a first flight control surface; wherein the flight control surface actuation system is a first flight control surface actuation system; wherein the skew detection system is a first skew detection system; wherein the first skew detection system is configured to generate a first skew detection signal that at least partially represents the skew condition of the first flight control surface; wherein the hybrid sensing actuator is a first hybrid sensing actuator; wherein the actuator output is a first actuator output; wherein the actuator output position sensor is a first actuator output position sensor; wherein the actuator output position signal is a first actuator output position signal; wherein the vehicle further comprises a second wing extending from the fuselage and comprising a second flight control surface with one or more control surface segments and a second flight control surface actuation system for operating the second flight control surface; wherein the second flight control surface actuation system includes a second skew detection system configured to detect a skew condition in the second flight control surface; wherein the second skew detection system is configured to generate a second skew detection signal that represents the skew condition of the second flight control surface; wherein the second skew detection system includes a second hybrid sensing actuator with a second actuator output and a second actuator output position sensor configured to generate a second actuator output position signal; wherein the controller is configured to receive the first skew detection signal from the first skew detection system and to receive the second skew detection signal from the second skew detection system; and wherein the controller is configured to generate the skew condition signal based, at least in part, on each of the first actuator output position signal and the second actuator output position signal.

12. The method of claim 8, wherein the wing is a first wing; wherein the flight control surface is a first flight control surface; wherein the flight control surface actuation system is a first flight control surface actuation system; wherein the skew detection system is a first skew detection system; wherein the hybrid sensing actuator is a first hybrid sensing actuator; wherein the actuator output is a first actuator output; wherein the actuator output position sensor is a first actuator output position sensor; wherein the actuator output position signal is a first actuator output position signal that indicates a position of the first actuator output; wherein the vehicle further comprises a second wing with a second flight control surface and a second flight control surface actuation system for operating the second flight control surface; wherein the second flight control surface actuation system includes a second skew detection system configured to detect a skew condition in the second flight control surface; wherein the second skew detection system includes a second hybrid sensing actuator with a second actuator output and a second actuator output position sensor configured to generate a second actuator output position signal that indicates a position of the second actuator output; and wherein the generating the skew condition signal includes comparing the first actuator output position signal and the second actuator output position signal.

13. The method of claim 12, wherein the generating the skew condition signal includes generating such that the skew condition signal indicates the presence of the skew condition in the first flight control surface responsive to the comparing the first actuator output position signal and the second actuator output position signal indicating that the position of the second actuator output is changing more rapidly than the position of the first actuator output.

14. The method of claim 8, wherein the respective segment end is one of a first segment end of the corresponding control surface segment or a second segment end of the corresponding control surface segment that is opposite the first segment end of the corresponding control surface segment; wherein the hybrid sensing actuator is operatively coupled to one of the first segment end and the second segment end of the corresponding control surface segment; wherein the actuator output position signal at least partially represents the segment end position of the one of the first segment end and the second segment end; wherein the skew detection system is configured to detect the segment end position of the other of the first segment end and the second segment end; and wherein the generating the skew condition signal includes comparing the segment end position of the first segment end and the segment end position of the second segment end of the corresponding control surface segment.

15. The method of claim 8, wherein the actuator output position signal indicates the rotational position of the actuator output as measured in revolutions.

16. The method claim 8, wherein the calculating the driveline position includes multiplying, with the controller, the rotational position of the actuator output by the gear ratio of the gear train.

17. The method of claim 8, further comprising transitioning the flight control surface between the retracted configuration and the extended configuration.

18. The method of claim 8, further comprising:
at least partially disabling the flight control surface; wherein the at least partially disabling the flight control surface is performed responsive to one or both of:
  (i) the skew condition signal indicating that the flight control surface is in the skew condition; and
  (ii) the skew condition signal indicating that the magnitude of the skew condition in the flight control surface is greater than a threshold operational skew magnitude.

19. The method of claim 18, wherein the at least partially disabling the flight control surface includes one or more of:
  (i) ceasing delivering torque to each control surface actuator;
  (ii) transitioning the flight control surface toward the retracted configuration; and
  (iii) transitioning the flight control surface toward the extended configuration.

20. The method of claim 19, wherein the at least partially disabling the flight control surface includes generating a control surface shutdown signal and transmitting the control surface shutdown signal to a power drive unit to cease generating torque in the driveline.

* * * * *